(12) United States Patent
Kovach et al.

(10) Patent No.: US 9,890,813 B2
(45) Date of Patent: *Feb. 13, 2018

(54) GEAR PUMP BEARINGS WITH HYBRID PADS

(71) Applicant: Hamilton Sundstrand Corporation, Charlotte, NC (US)

(72) Inventors: Brandon T. Kovach, Rockford, IL (US); Steven A. Heitz, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 362 days.

This patent is subject to a terminal disclaimer.

(21) Appl. No.: 14/531,373

(22) Filed: Nov. 3, 2014

(65) Prior Publication Data

US 2016/0123390 A1 May 5, 2016

(51) Int. Cl.
*F03C 2/00* (2006.01)
*F03C 4/00* (2006.01)
(Continued)

(52) U.S. Cl.
CPC ........ *F16C 32/0666* (2013.01); *F01C 21/108* (2013.01); *F04C 2/18* (2013.01);
(Continued)

(58) Field of Classification Search
CPC .... F04C 2/18; F04C 15/0088; F04C 2240/50; F04C 2240/54; F04C 2240/56;
(Continued)

(56) References Cited

U.S. PATENT DOCUMENTS 2,479,077 A 8/1949 McAlvay
2,728,301 A * 12/1955 Lindberg ............ F04C 15/0026
418/135

(Continued)

FOREIGN PATENT DOCUMENTS

EP 0310292 A2 4/1989
EP 1890045 2/2008
(Continued)

OTHER PUBLICATIONS

Combined Search and Examination Report, for British Patent Appliaction No. GB1519402.0, dated May 13, 2016, 8 pages.
European Search Report for European Application No. 15178793.4, dated Dec. 9, 2015, 10 pages.

*Primary Examiner* — Theresa Trieu
(74) *Attorney, Agent, or Firm* — Kinney & Lange, P.A.

(57) ABSTRACT

A gear pump includes a drive gear mounted to a first gear shaft, a driven gear meshable with the drive gear, a plurality of journal bearings, and a first porting path. The first porting path is adapted to provide high pressure fluid communication from a discharge of the gear pump to a first hybrid pad location for a first journal bearing selected from the plurality of journal bearings, the first hybrid pad location circumferentially adjacent to a first fluid film location. Each location is disposed annularly between an inner surface of the first journal bearing, and an outer surface of the first gear shaft or second gear shaft corresponding to the first journal bearing.

32 Claims, 13 Drawing Sheets

(51) Int. Cl.
 *F04C 2/00* (2006.01)
 *F04C 15/00* (2006.01)
 *F16C 32/06* (2006.01)
 *F01C 21/10* (2006.01)
 *F04C 2/18* (2006.01)
 *F01C 21/08* (2006.01)

(52) U.S. Cl.
 CPC ...... *F04C 15/0088* (2013.01); *F16C 32/0659* (2013.01); *F01C 21/0863* (2013.01); *F04C 2240/54* (2013.01); *F04C 2240/56* (2013.01)

(58) Field of Classification Search
 CPC ............ F04C 2240/802; F16C 32/0659; F16C 32/0666; F01C 21/108; F01C 21/0863
 USPC ......... 418/73, 75, 79, 80, 102, 206.1–206.8; 384/118
 See application file for complete search history.

(56) References Cited

U.S. PATENT DOCUMENTS

| | | | | |
|---|---|---|---|---|
| 2,775,209 | A | * | 12/1956 | Albright ............. F04C 15/0088 418/102 |
| 2,823,616 | A | * | 2/1958 | Shigeo ................ F01C 21/0863 418/80 |
| 2,891,483 | A | * | 6/1959 | Murray ............... F01C 21/0863 418/80 |
| 3,528,756 | A | | 9/1970 | Norlin et al. |
| 4,289,460 | A | | 9/1981 | Noell et al. |
| 2016/0032969 | A1 | | 2/2016 | Kovach et al. |

FOREIGN PATENT DOCUMENTS

| | | |
|---|---|---|
| EP | 2672119 | 12/2013 |
| EP | 2 700 831 A1 | 2/2014 |
| EP | 2980353 A1 | 2/2016 |
| GB | 883356 | 11/1961 |

\* cited by examiner

GEAR PUMP BEARINGS WITH HYBRID PADS

BACKGROUND

The present embodiments relate generally to gear pumps and, more particularly, to journal bearings for a gear pump.

A gear pump operates to pump fluid from an inlet to an outlet. Generally, a gear pump utilizes multiple gears, including a drive gear and a driven gear, each with respective teeth. The drive gear is rotated, and in turn rotates the driven gear at a location where the respective teeth mesh. Fluid enters the inlet and travels between the teeth of the drive gear and a housing, and the teeth of the driven gear and the housing. As the gears turn, the fluid is pulled towards the outlet and squeezed out of the pump due to a pressure differential between the inlet and outlet.

Both the drive gear and the driven gear are supported within the gear pump by respective gear shafts. Each gear shaft is in turn supported by both a pressure loaded journal bearing and a stationary journal bearing, both of which react the load of the gear shaft. The gear shaft load is carried by both the stationary and pressure loaded journal bearings through a fluid film pressure in each journal bearing, between a surface of the gear shaft and a surface of the journal bearing. Bearings such as these, which support their loads on a layer of liquid, are known as hydrodynamic bearings. Pressure develops in the fluid film as a result of a velocity gradient between the rotating surface of the gear shaft and the surface of the journal bearing (i.e., a viscosity of the fluid resists a shearing action of the velocity gradient).

A conventional hydrodynamic bearing will operate at a fluid film thickness at which the film pressure in the journal bearing reacts the loads applied to the gear and gear shaft. However, for a given operating condition, as the loads continue to increase the fluid film thickness will continue to reduce until the surfaces of the gear shaft and the journal bearing physically contact one another. This is referred to as a "bearing touchdown," and can cause damage, decreased performance, or catastrophic failure of the gear pump. One solution for increasing the load carrying capacity of a given hydrodynamic journal bearing is to increase a size of the journal bearing. However, in certain gear pump applications operating and/or weight requirements do not permit the use of a larger and/or heavier journal bearing.

SUMMARY

An example embodiment includes a gear pump having a drive gear mounted to a first gear shaft, a driven gear meshable with the drive gear and mounted to a second gear shaft, a plurality of journal bearings, and a first porting path. The plurality of journal bearings includes at least a drive-side pressure loaded journal bearing disposed about a first longitudinal end of the first gear shaft, a drive-side stationary journal bearing disposed about a second opposing longitudinal end of the first gear shaft, a driven-side pressure loaded journal bearing disposed about a first longitudinal end of the second gear shaft, and a driven-side stationary journal bearing disposed about a second opposing longitudinal end of the second gear shaft. The first porting path is adapted to provide high pressure fluid communication from a discharge of the gear pump to a first hybrid pad location for a first journal bearing selected from the plurality of journal bearings. The first hybrid pad location is circumferentially adjacent to a first fluid film location, and each is disposed annularly between an inner surface of the first journal bearing, and an outer surface of the first or second gear shaft corresponding to the first journal bearing.

An example embodiment includes a journal bearing assembly having at least a first journal bearing. The first journal bearing includes a cylindrical body, a bearing flat, a central recess, and a porting path. The cylindrical body includes a generally circumferential outer surface longitudinally between a first longitudinal end and a second longitudinal end. The bearing flat forms a portion of the otherwise circumferential outer surface. The central recess is formed in the first longitudinal end of the cylindrical body, is adapted to receive a longitudinal end of a gear shaft, and includes a hybrid pad location circumferentially adjacent to a fluid film location. The hybrid pad location has a minimum leading edge angular location of at least 30.0° relative to the bearing flat. The porting path, extending through the cylindrical body between the outer surface and the central recess, is adapted to provide high pressure fluid communication between an exterior of the first journal bearing and the hybrid pad location.

Figure 1:
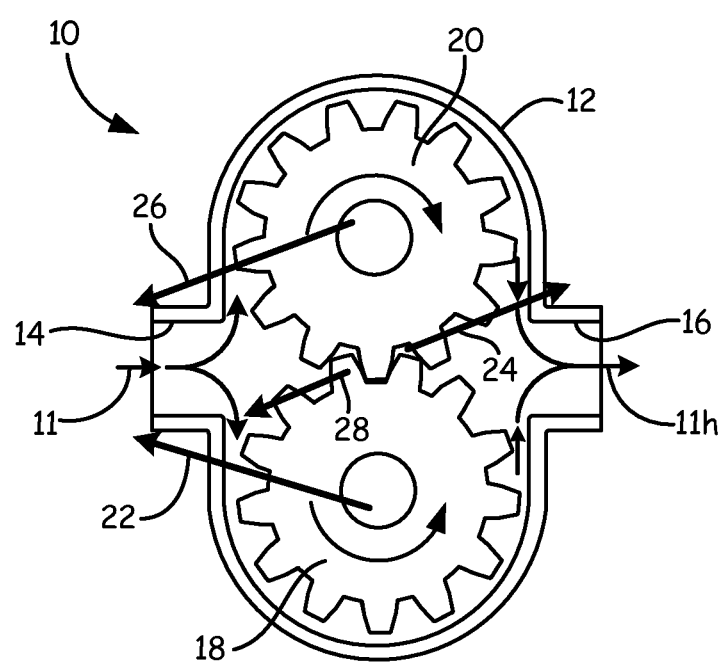
FIG. 1 is a schematic, cross-sectional view of a gear pump showing the approximate direction of loads affecting both drive and driven gears of the gear pump.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, in a gear pump with journal bearings supporting drive gear and driven gear assemblies, load carrying capacities of the journal bearings can be increased without increasing a size of the bearings. This can be done, for example, by supplying high pressure fluid to generate a hybrid pad at a location annularly between an inner surface of the journal bearing and the corresponding (drive or driven) gear shaft. The hybrid pad is formed at the annular location on the journal bearing(s), and feeds or refreshes a fluid film at an adjacent fluid film location. The high pressure fluid, such as from a discharge or outlet of the gear pump, can be supplied to the hybrid pad location and in turn the fluid film location. This can allow the fluid film, and thus the journal bearing(s), to support an increased load, while at the same time meeting stringent gear pump operating and/or weight requirements. Locations of the hybrid pad on each journal bearing is critical for successfully increasing load carrying capacity of the each journal bearing without compromising gear pump flow requirements.

FIG. 1 is a schematic, cross-sectional view of an embodiment of gear pump 10. Gear pump 10 includes fluid 11, high pressure fluid 11*h*, gear pump housing 12, gear pump inlet 14 (sometimes referred to as the front of gear pump 10), gear pump outlet 16 (sometimes referred to as the rear of gear pump), drive gear 18, and driven gear 20. Drive gear 18 experiences radial pressure load 22 and power transfer reaction load 24, whereas driven gear 20 experiences radial pressure load 26 and power transfer reaction load 28.

Gear pump 10 can operate to pump fluid 11 at a constant rate from inlet 14 to outlet 16. Fluid 11 enters housing 12 at inlet 14. Using a relatively low supplied inlet pressure, fluid 11 fills into gaps between teeth of drive gear 18 and housing 12, and teeth of driven gear 20 and housing 12. Drive gear 18 is rotated, in a counterclockwise direction in the illustrated embodiment, which in turn rotates driven gear 20, in a clockwise direction in the illustrated embodiment. As gears 18 and 20 turn, fluid 11 is moved toward relatively high pressure outlet 16 and squeezed out from housing 12 as high pressure fluid 11*h*. Fluid 11 (and 11*h*) and fluid film 152 (shown in FIG. 4A) can be, for example, Jet A or Jet A-1 fuel, which is at a temperature of approximately 300° F. (149° C.) when entering inlet 14 of gear pump 10.

For a given gear pump 10, drive gear 18 and driven gear 20 experience different loading. For example, drive gear 18 experiences radial pressure load 22 and power transfer reaction load 24 in the directions shown in FIG. 1. Radial pressure load 22 results from a pressure gradient of fluid 11 (i.e., low pressure at inlet 14 and high pressure at outlet 16), and power transfer reaction load 24 results from resistance of driven gear 20 which is rotated by drive gear 18. Driven gear 20 experiences radial pressure load 26 and power transfer reaction load 28 in the directions shown in FIG. 1. Radial pressure load 26 similarly results from fluid 11 pressure gradient, and power transfer reaction load 28 results from driven gear 20 being pushed by drive gear 18.

Because drive gear 18 and driven gear 20 experience different loading, the respective journal bearings which support each gear 18 and 20, via respective gear shafts (shown in FIG. 2) of each gear 18 and 20, also experience different loading. Therefore, because of the differing loads on each of the at least four bearings, the structure for increasing the load carrying capacity of each journal bearing is also specific to each supporting journal bearing. Thus, the discussion to follow will specifically address each of the plurality of journal bearings which support drive gear 18 and driven gear 20.

Figure 2:
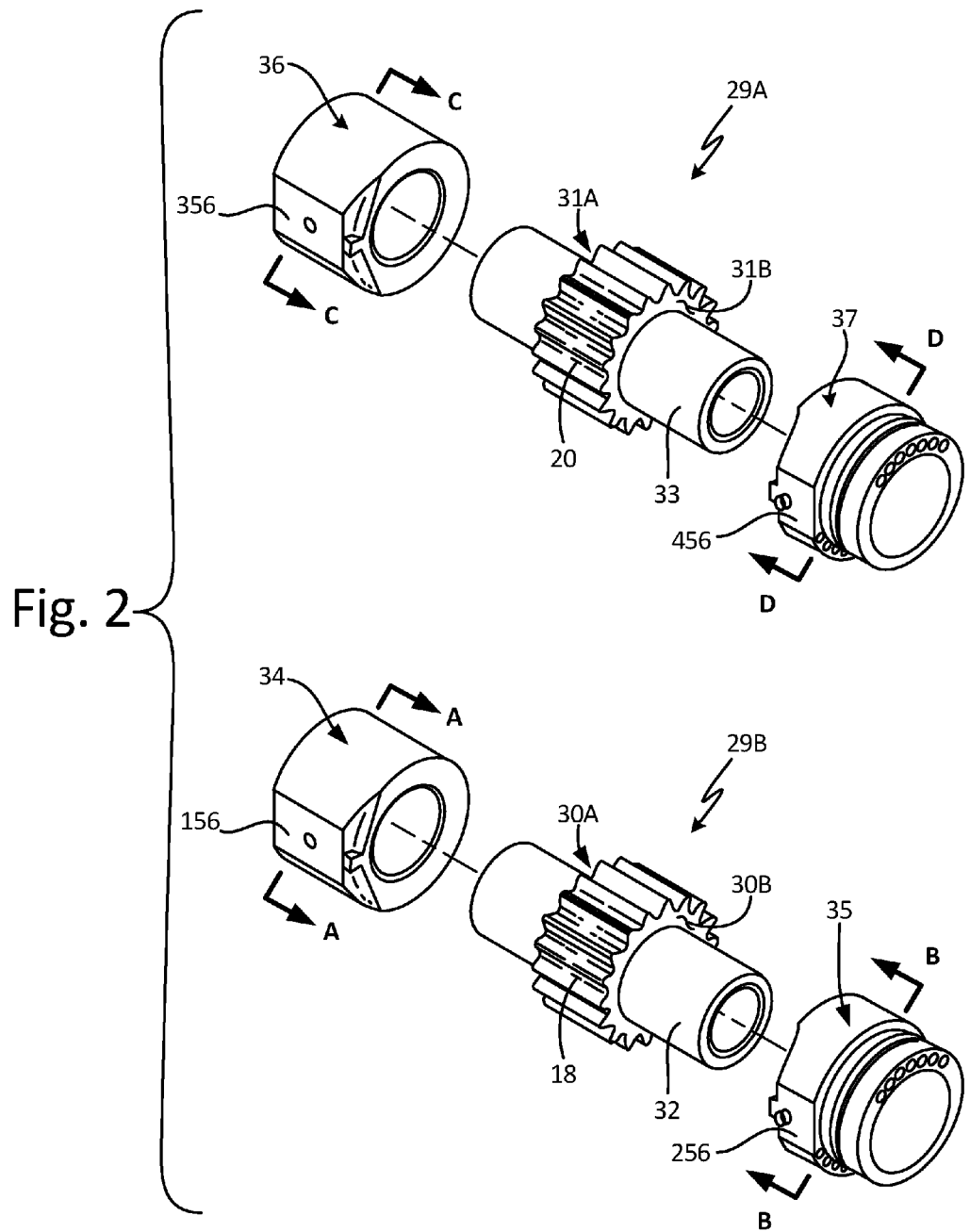
FIG. 2 is an exploded perspective view of a gear pump including a drive gear, a pair of drive-side bearings, a driven gear and a pair of driven-side bearings.

FIG. 2 is an exploded, perspective view of drive gear 18 and driven gear 20. As was also shown in FIG. 1, drive gear 18 is meshable with driven gear 20, which are respectively mounted to drive gear shaft 32 and driven gear shaft 33 as part of drive gear shaft support assembly 29A and driven gear shaft support assembly 29B.

Drive gear 18 has axially opposed gear faces 30A, 30B and is mounted to a first (or drive) gear shaft 32, supporting drive gear 18 in gear pump 10. Similarly, driven gear 20 has axially opposed gear faces 31A, 31B and is mounted to a second (or driven) gear shaft 33, supporting driven gear 20 in gear pump 10. To form one journal bearing assembly, one or both longitudinal ends of first, or drive-side, gear shaft 32, can be respectively received in central recesses of drive-side stationary journal bearing 34 and drive-side pressure loaded journal bearing 35. Another journal bearing assembly can include one or both longitudinal ends of second, or driven-side, gear shaft 33, which are in turn respectively received by driven-side stationary journal bearing 36 and driven-side pressure loaded journal bearing 37. Each pair of journal bearings can thus respectively support drive-side gear shaft 32 and/or driven-side gear shaft 33.

Sectional views A-A, B-B, C-C, and D-D are respectively taken through the cylindrical body of each bearing 34, 35, 36, 37 as well as respective shafts 32, 33, shown in FIG. 2. FIG. 2 also shows bearing flats 156, 256, 356, 456, which respectively form a portion of the otherwise generally circumferential outer surfaces of the cylindrical bearing bodies, and from which relative angular locations of internal and external bearing features can be measured.

Stationary journal bearings 34, 36 are each fixed in place, for example, against housing 12 (shown in FIG. 1), whereas pressure loaded (or "floating") journal bearings 35, 37 can translate axially relative to respective gear shafts 32, 33. Loads experienced by drive gear 18, as shown in FIG. 1, are transferred to gear shaft 32. Since drive-side stationary journal bearing 34 and drive-side pressure loaded journal bearing 35 react the loads experienced by gear shaft 32, bearings 34, 35 also react many of the loads experienced by drive gear 18. Similarly, loads experienced by driven gear 20, also shown in FIG. 1, are transferred to gear shaft 33. And since driven-side stationary journal bearing 35 and driven-side pressure loaded journal bearing 36 react the loads second gear shaft 33, bearings 36, 37 also react many of the loads experienced by driven gear 20.

Each pair of bearings, disposed at opposing longitudinal ends of respective gear shafts 32, 33, carries shaft loads through a fluid film located between an inner surface of each bearing and an outer surface of each gear shaft. The fluid film can be supplemented by a hybrid pad as discussed below.

Figure 3A:
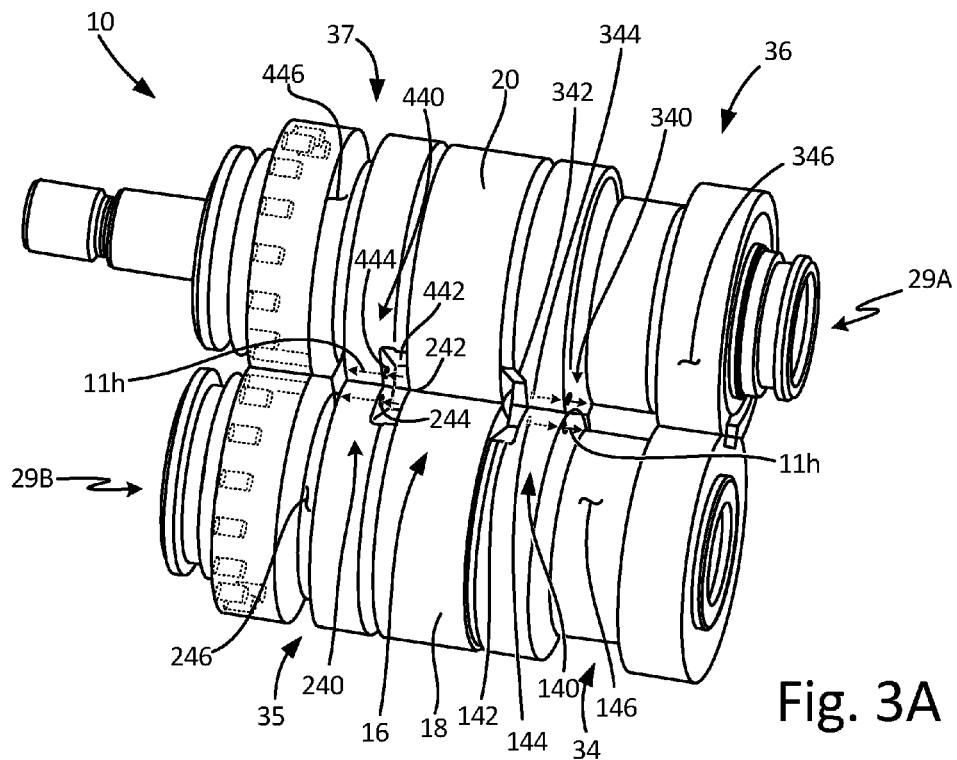
FIGS. 3A and 3B are schematic perspective views of a gear pump illustrating a plurality of porting paths.
Figure 3B:
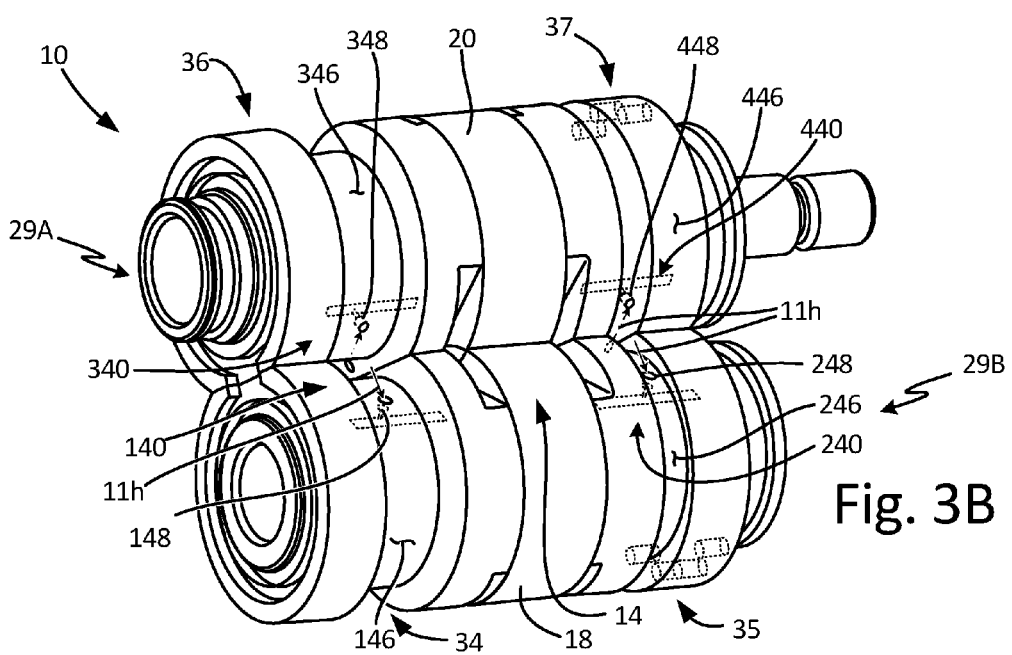

FIG. 3A is a schematic, rear perspective view of a portion of gear pump 10 illustrating first portions of porting paths 140, 240, 340, and 440, while FIG. 3B is a schematic, front perspective view of a portion of gear pump 10 illustrating second portions of porting paths 140, 240, 340, and 440. For simplicity of illustration, FIGS. 3A and 3B do not specifically show details of teeth on gears 18, 20. Porting paths 140, 240, 340, 440 each lead from a high-pressure fluid source (such as a discharge of gear pump 10) to hybrid pad recess locations 151, 251, 351, 451 for respective ones of each of at least four bearings 34, 35, 36, 37. Generally, a porting path (140, 240, 340, 440) leading to and through each bearing (34, 35, 36, 37) includes a discharge face cut (142, 242, 342, 442), an axial hole (144, 244, 344, 444), a radial spool cut (146, 246, 346, 446), and a capillary port (148, 248, 348, 448) so that high-pressure fluid 11$h$ from the pump discharge outlet 16 can be sent to the individual hybrid pad recess locations 151, 251, 351, 451 on each of the bearings. Details of the porting paths for each bearing, as well as each hybrid pad recess location, will be shown and described in turn.

Drive-Side Stationary Journal Bearing 34

Figure 4A:
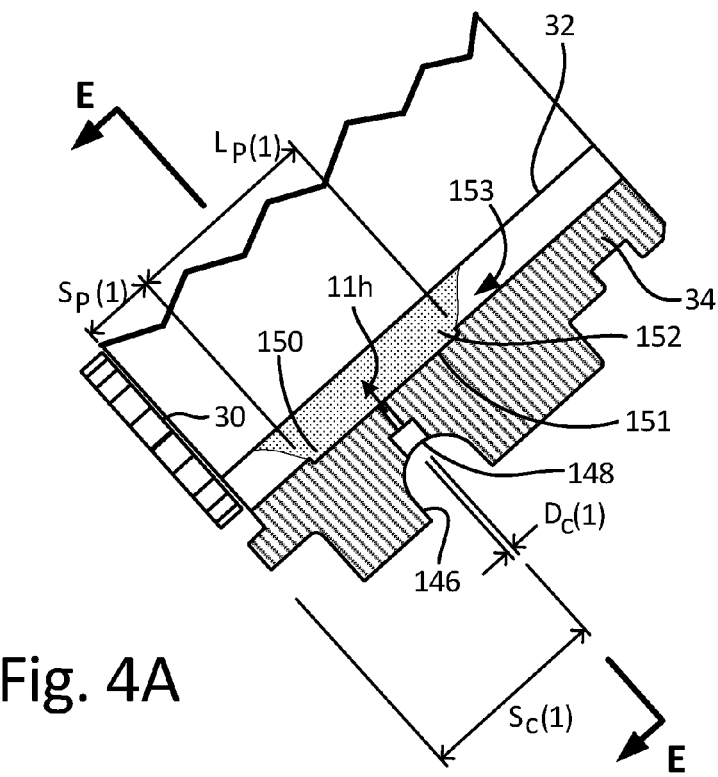
FIG. 4A is a cross-sectional view of a drive-side stationary journal bearing taken along line A-A of FIG. 2.
Figure 4B:
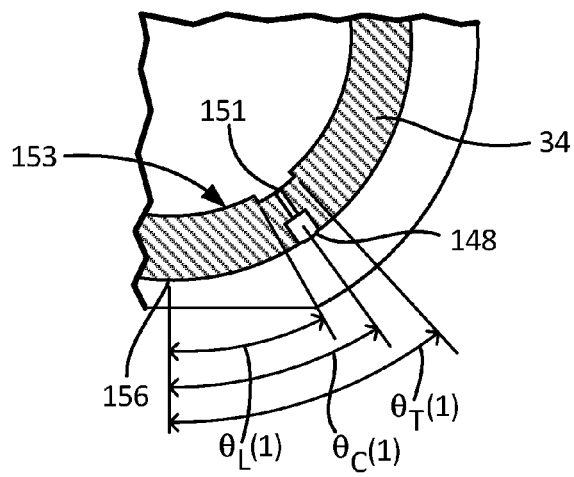
FIG. 4B is another cross-sectional view of the drive-side stationary journal bearing taken along line E-E of FIG. 4A.

FIGS. 4A and 4B are cross-sectional views of drive-side stationary journal bearing 34. In the example shown, drive-side stationary journal bearing 34 is a first of a plurality of bearings which can be used for supporting portions of gear pump 10. The sectional view in FIG. 4A is taken along line A-A of FIG. 2, while FIG. 4B is taken along line E-E of FIG. 4A.

First porting path 140 can be made up of first discharge face cut 142 (shown in FIG. 3A) on drive-side stationary journal bearing 34, first axial hole 144 (also shown in FIG. 3A) through bearing 34, first radial spool cut 146 on bearing 34, and first capillary port 148. First capillary port 148 can have diameter $D_C(1)$, as well as axial spacing $S_C(1)$ (measured from gear face 30A) and capillary port angular location $\theta_C(1)$ (measured from first bearing flat 156 shown in FIG. 2). As also shown below, first hybrid pad 150 and its corresponding first hybrid pad recess location 151 can have axial length $L_P(1)$ and axial spacing $S_P(1)$ (spacing measured from gear face 30A), while an angular location for hybrid pad 150 can be defined at least in part via leading edge angular location $\theta_L(1)$, and trailing edge angular location $\theta_T(1)$. Unless otherwise specified, all angular locations are referenced relative to a center of a corresponding bearing flat 156 (i.e. zero degrees), in the direction of shaft rotation (i.e. towards inlet 14, away from outlet 16).

Load carrying capacity of a first one of a plurality of journal bearings, drive-side stationary journal bearing 34, can be increased by delivering high pressure fluid 11$h$ from outlet 16 to form first hybrid pad 150 at a corresponding first hybrid pad recess location 151. To form first hybrid pad 150 at or around particular hybrid pad recess location(s) 151 proximate or adjacent to fluid film location 153, a portion of the high-pressure fluid 11$h$ exiting from outlet 16 can be supplied through porting path 140. Specifically, high-pressure fluid 11$h$ discharges from outlet 16 at first discharge face cut 142 and pass through first axial hole 144 (both shown in FIG. 3A), to first radial spool cut 146. Once at first radial spool cut 146, fluid 11$h$ then travels circumferentially around first radial spool cut 146 and into first capillary port 148, as shown in FIG. 3B.

As shown in FIGS. 3B, 4A, and 4B, first capillary port 148 can extend through drive-side stationary journal bearing 34 from first radial spool cut 146 to form first hybrid pad 150. First hybrid pad 150 has a corresponding first hybrid pad recess location 151 where high pressure fluid 11$h$ can be injected, in use, to supplement fluid film 152 at fluid film location 153. Therefore, when high-pressure fluid 11$h$ enters into first capillary port 148 from first radial spool cut 146, it can be delivered to a first hybrid pad recess location 151 for first hybrid pad 150. In the illustrated embodiment, first capillary port 148 has on-center axial spacing $S_C(1)$ of approximately 0.593 inch (1.506 cm) from first drive gear face 30A and diameter $D_C(1)$ of approximately 0.023 inch (0.058 cm). However, manufacturing tolerances for diameter $D_C(1)$ can include up to +0.004 inch (0.010 cm). First capillary port 148 can be in fluid communication with first hybrid pad 150 anywhere along the first hybrid pad recess location 151. For example, first capillary port 148 can be configured so as to be centered on first hybrid pad 150 and/or first hybrid pad recess location 151, or as shown in the first illustrated embodiment, first capillary port 148 can be configured to be offset from a center of first hybrid pad 150 and/or first hybrid pad recess location 151. As shown in this example, first capillary port 148 is centered only slightly offset from a center of first hybrid pad 150 (and its corresponding recess location 151) because first capillary port 148 can be located at or near where it is most cost-effective to machine, given a geometry of bearing 34.

In the illustrated embodiment, first hybrid pad 150 (and corresponding first recess location 151) has axial length $L_P(1)$ of approximately 0.540 inch (1.37 cm). It also has first axial spacing $S_P(1)$ of approximately 0.300 inch (0.762 cm) from first drive gear face 30A as measured from an edge of first hybrid pad 150 closest to first drive gear face 30A. However, manufacturing tolerances for first axial length $L_P(1)$ and first axial spacing $S_P(1)$ can include ±0.01 inch (0.025 cm). A configuration of first hybrid pad 150 is critical to successfully achieve increased load carrying capacity on drive-side stationary journal bearing 34. First hybrid pad 150 has a corresponding recess location 151 such that first hybrid pad 150 has a minimum leading edge angular location ($\theta_{Lmin}(1)$) of 30.0°, and a maximum trailing edge angular location ($\theta_{Tmax}(1)$) of 42.0° (i.e., all of first hybrid pad 150 is within an angular location range of 30.0°-42.0°, but need not extend fully within this range). In one embodiment (shown in FIG. 4B), first hybrid pad 150 extends fully within the angular location range of 30.0°-42.0°, such that $\theta_{Lmin}(1)$ is equal to $\theta_L(1)$ and $\theta_{Tmax}(1)$ is equal to $\theta_T(1)$. In other embodiments, first hybrid pad 150 can have a leading edge angular location $\theta_L(1)$ of 31°, and a trailing edge angular location $\theta_T(1)$ of 41°. In yet further embodiments, first hybrid pad 150 can have a leading edge angular location $\theta_L(1)$ of 34°, and a trailing edge angular location $\theta_T(1)$ of 38°. As shown, first hybrid pad 150 is centered at angular location $\theta_P(1)$ of 36° (shown in FIG. 5). More generally, to provide suitable film augmentation with maximum acceptable leakage in gear pump applications, other embodiments can have an overall first hybrid pad 150 width of about 8°-12°, and/or first hybrid pad 150 can be centered at locations other than 36° as long as all of first hybrid pad 150 is axially located within the angular location range of 30.0°-42.0°. With first hybrid pad 150 in an angular location range of 30.0°-42.0°, first capillary port 148 has angular location $\theta_C(1)$ on bearing 34 of approximately 36.0°, as measured from a centerline of first bearing flat 156.

In use, first fluid film 152, as shown in FIG. 4A, can be disposed at first fluid film location 153 between a surface of drive-side stationary journal bearing 34 and a surface of gear shaft 33. Fluid 11 is used to create fluid film 152, because as gear pump 10 begins to operate, a portion of fluid 11 from within housing 12 is axially drawn to location 153 shown in FIG. 4A. Bearing 34 supports one longitudinal end of first gear shaft 32 by reacting loads applied by this end of first gear shaft 32 through fluid film 152. By injecting high pressure fluid 11h into first hybrid pad 150, adjacent to fluid film location 153, first fluid film 152 is supplemented, and the resulting pressure of is increased compared to a baseline pressure of fluid film 152 drawn from housing 12 alone, and therefore, the load carrying capacity of drive-side stationary journal bearing 34 is increased compared to conventional gear pump bearings. In the illustrated embodiment, pressurizing or supplementing fluid film 152 with high pressure fluid 11h increases a thickness of fluid film 152 by approximately 0.000010 inch (0.000025 cm), and as a result, bearing 34 can carry greater loads without risk of a bearing touchdown.

Figure 5:
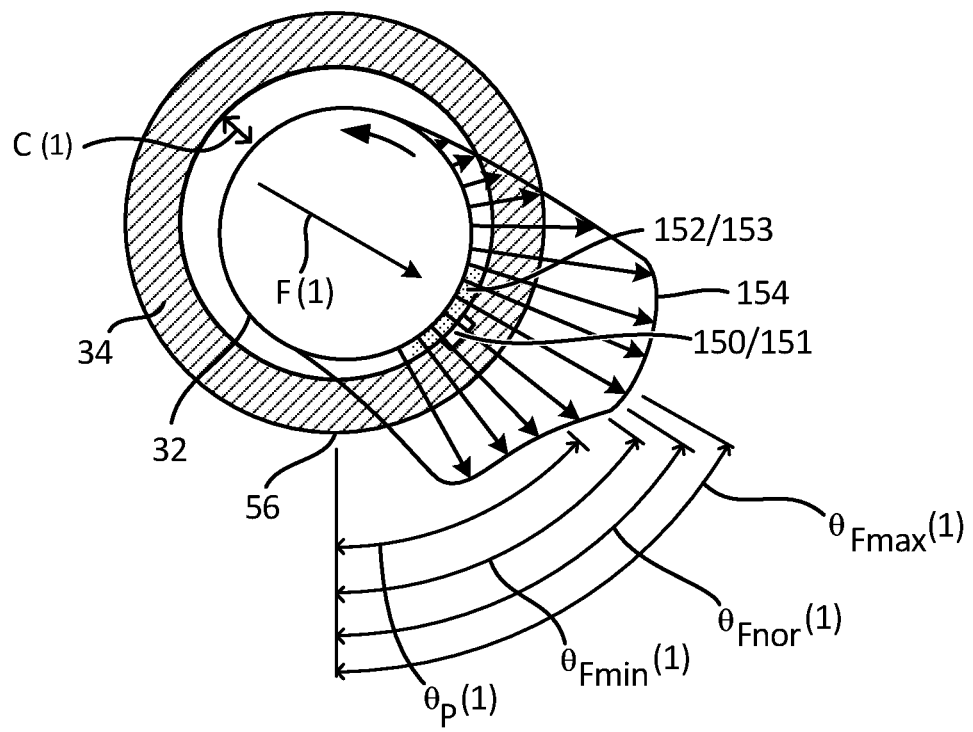
FIG. 5 is schematic diagram showing a pressure distribution profile of the drive-side stationary journal bearing which includes a first hybrid pad.

FIG. 5 is a schematic diagram showing a first bearing pressure distribution profile 154 when first hybrid pad 150 is properly configured. FIG. 5 also shows maximum diametral clearance C(1) between a surface of drive-side stationary bearing 34 and a surface of first gear shaft 32, hybrid pad center angular location $\theta_P(1)$, maximum radial load F(1), load F(1) maximum angular location $\theta_{Fmax}(1)$, load F(1) minimum angular location $\theta_{Fmin}(1)$, and load F(1) normalized angular location $\theta_{Fnor}(1)$. Angular locations are measured from first bearing flat 156. Thus the angular location with respect to drive-side stationary bearing 34 is clockwise from first bearing flat 156 viewed from gear face 30A, or counter-clockwise when viewed toward face 30A as in FIG. 4B.

Load F(1) represents a summation of loads acting on drive gear 18 (e.g., loads 22 and 24 shown in FIG. 1). Maximum radial load F(1) can range in location from load F(1) maximum angular location $\theta_{Fmax}(1)$ to load F(1) minimum angular location $\theta_{Fmin}(1)$. Angular location $\theta_{Fnor}(1)$ is a normalized location for the range of angles at which load F(1) can act.

For the illustrated first pressure distribution profile 154 of bearing 34, first gear shaft 32 rotates at a speed of approximately 8935 RPM, while maximum diametral clearance C(1) between an inner surface of drive-side stationary bearing 34 and an outer surface of first gear shaft 32 (at one longitudinal end) is approximately 0.0039 inch (0.00991 cm). In the illustrated embodiment, load F(1) can be applied at angular locations ranging from $\theta_{Fmin}(1)$ of approximately 44.4° to $\theta_{Fmax}(1)$ of approximately 53.0°, with load F(1) having normalized angular location $\theta_{Fnor}(1)$ of 49.2°. Maximum load F(1) is approximately 594 lb$_f$/in$^2$ (4095 kPa) in magnitude and represents the highest magnitude loading to be experienced by drive-side stationary bearing 34 in the illustrative gear pump application.

By properly configuring first hybrid pad 150 and injecting correct amounts of high-pressure fluid 11h to supplement first fluid film 152 via first hybrid pad 150, maximum load F(1) can be carried by bearing 34 through first fluid film 152 without risk of failure (i.e., touchdown of bearing 34). The proper configuration of first hybrid pad 150 is a function of a plurality of factors, which can include, for example, a rotational speed of first gear shaft 32, a magnitude and angle of radial load F(1), a maximum diametral clearance C(1) between an inner surface of bearing 34 and an outer surface of first gear shaft 32, a geometry of first gear shaft 32 relative to bearing 34, as well as properties (e.g., density, viscosity, specific heat) of fluid film 152. An improperly configured first hybrid pad 150 can vent pressure of first fluid film 152, instead of adding to its pressure, resulting in a decrease in load carrying capability of bearing 34. Also, an improperly configured first hybrid pad 150 can result in excessive leakage of gear pump 10, preventing it from meeting flow requirements.

Figure 6:
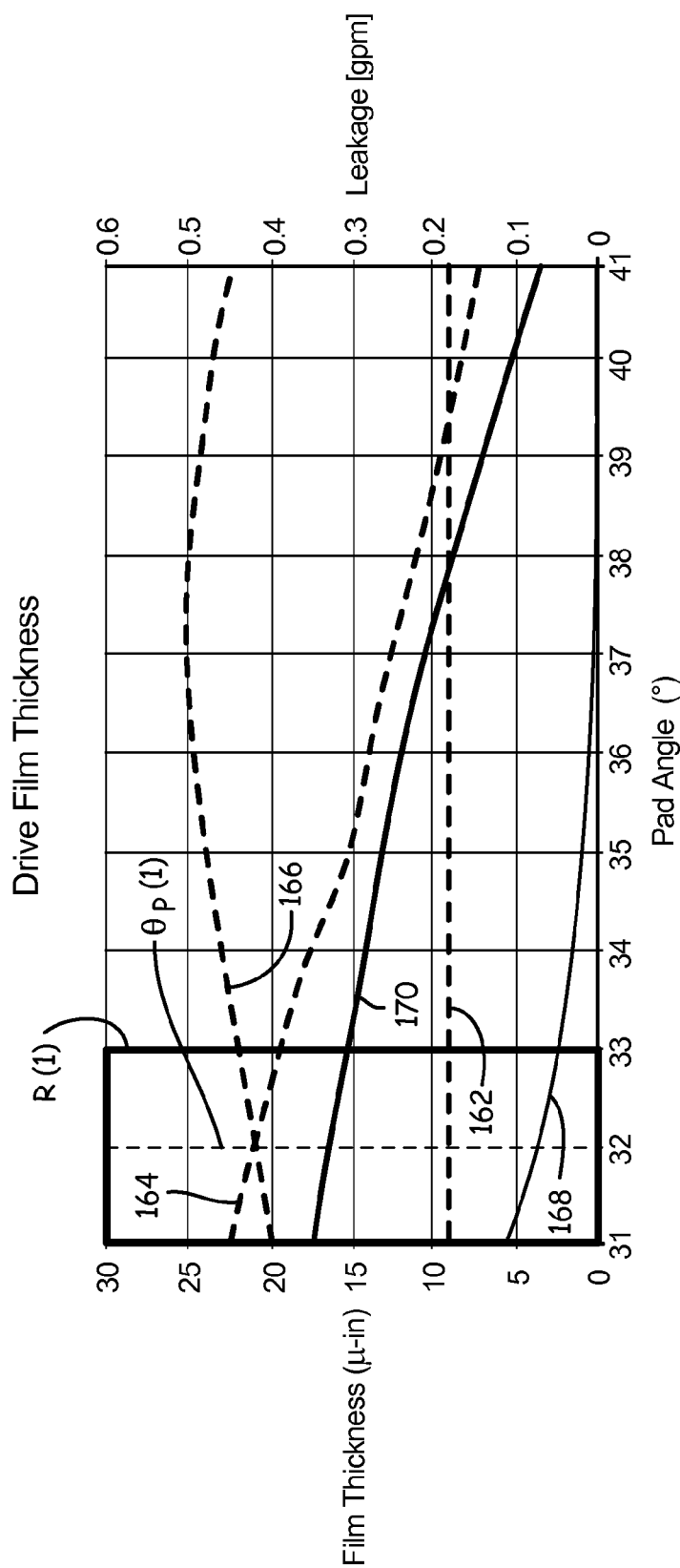
FIG. 6 is graph illustrating fluid film performance in the drive-side stationary journal bearing as a function of a first hybrid pad configuration.

FIG. 6 graphically illustrates both performance of first fluid film 152, and leakage of gear pump 10, as a function of the configuration of first hybrid pad 150. FIG. 6 data reflects maximum load F(1) (shown in FIG. 5) of approximately 594 lb$_f$/in$^2$ (4095 kPa) (i.e., the maximum, most challenging loading scenario for drive-side stationary journal bearing 34 under the given gear pump 10 application). Load F(1) minimum angular location $\theta_{Fmin}(1)$ is approximately 44.4°, and load F(1) maximum angular location $\theta_{Fmax}(1)$ is approximately 53.0°. A horizontal axis indicates angular location of first hybrid pad 150, as measured to a center of first hybrid pad 150 from first bearing flat 156 (in a direction of rotation, i.e. toward inlet 14 and away from outlet 16). Included on the horizontal axis is chosen hybrid pad center angular location $\theta_P(1)$ (hybrid pad 150 is centered at an angular location of 36°), as well as region R(1) which represents a range of first hybrid pad 150 center angular location $\theta_P(1)$ based on manufacturing tolerances (with all of first hybrid pad 150 axially within an angular location range of 30.0°-42.0°, as discussed previously). Region R(1) encompasses first hybrid pad 150 center angular locations $\theta_P(1)$ of approximately 35.0° to approximately 37.0°. A left vertical axis indicates a thickness of first fluid film 152 versus first hybrid pad 150 angular location, given by dashed plot lines. Thickness of first fluid film 152 is indicated by dashed lines and which include baseline plot 162 where no hybrid pad is used on bearing 34, plot 164 where first hybrid pad 150 is used and load F(1) is at a minimum load angular location $\theta_{Fmin}(1)$, and plot 166 where first hybrid pad 150 is used and load F(1) is at a maximum load angular location $\theta_{Fmax}(1)$.

Plot 162 (no hybrid pad) shows a thickness of first fluid film 152 is approximately 9.4 microinches (0.239 μm) at all angular positions of load F(1). When first hybrid pad 150 is configured on bearing 34 at angular location $\theta_P$ (36°), both plot 164 (minimum load angle) and plot 166 (maximum load angle) show a thickness of first fluid film 152 at $\theta_P(1)$ of approximately 20.8 microinches (0.528 Ξm). Therefore, by pressurizing and supplementing first fluid film 152 with high pressure fluid 11h at hybrid pad 150 configured at angular location $\theta_P(1)$ of about 36°, bearing 34 has a thicker first fluid film 152 and thus can carry a greater load as compared to bearing 34 without first hybrid pad 150 (plot 162). It can also maintain first fluid film 152 at a thickness great enough to support maximum load F(1) over a range of angles of load F(1). Further, designing gear pump 10 such that hybrid pad 150 is located at or about angular location $\theta_P(1)$ of about 36° allows for manufacturing tolerances within region R(1) which permit bearing 34 to perform over a range of angles of maximum load F(1) because $\theta_P(1)$ is near a maximum thickness of first fluid film 152, yet reduces a risk of manufacturing tolerances leading to a location of first hybrid pad 150 where thickness of first fluid film 152 significantly decreases.

A right vertical axis of FIG. 6 indicates leakage of gear pump 10 at the various first hybrid pad 150 angular locations on the horizontal axis, given by solid plot lines. Leakage of gear pump 10 represents a loss of flow capacity of gear pump 10 due to some of fluid 11h from discharge 16 being diverted from one or more destinations and instead delivered to first hybrid pad 150. Thus, when no hybrid pad is used, additional leakage of gear pump 10 is effectively zero. Leakage of gear pump 10 (solid plot lines) include plot 168 where first hybrid pad 150 is used and load F is at a minimum load angular location $\theta_{Fmin}(1)$, and plot 170 where first hybrid pad 150 is used and load F is at a maximum load angular location $\theta_{Fmax}(1)$. As can be seen, first hybrid pad 150 configuration also significantly affects leakage of gear pump 10. When first hybrid pad 150 is configured at angular location $\theta_P(1)$ (36°), plot 168 (minimum load angle) shows gear pump 10 leakage is approximately 0.08 gpm (0.30 l/min) at $\theta_P(1)$, while plot 170 (maximum load angle) shows gear pump 10 leakage is approximately 0.32 gpm (1.21 l/min) at $\theta_P(1)$. Therefore, by configuring first hybrid pad 150 at or about angular location $\theta_P(1)$ of 36°, gear pump 10 leakage is kept within a manageable range over the range of load angles, which can allow gear pump 10 to meet flow requirements under the various loads without compromising thickness of first fluid film 152 and in turn, the load carrying capacity of bearing 34 over the angular range of load F(1). Although altering configuration of first hybrid pad 150 forward by a few angular degrees can decrease gear pump 10 leakage, this configuration can also excessively vent fluid film 152 pressure for plot 164, decreasing thickness of first fluid film 152, and reduce load carrying capacity for at least some angular ranges of load F(1). On the other hand, altering first hybrid pad 150 configuration backward by a few angular degrees can result in excessive leakage of gear pump 10 and prevent gear pump 10 from meeting flow requirements to desired destinations.

Consequently, by properly configuring first hybrid pad 150 and delivering high pressure fluid 11h to first fluid film 152 at a location for first hybrid pad 150, the load carrying capacity of bearing 34 can be increased, without obstructing gear pump 10 from meeting flow requirements, such that a risk of a bearing touchdown is eliminated or substantially eliminated. Yet, bearing 34 size and/or weight is not increased, and as a result gear pump 10 can be utilized in applications with operating and/or weight requirements.

In addition to drive-side stationary journal bearing 34, one or more of the other journal bearings supporting portions of gear pump 10 can also be provided with a corresponding hybrid pad location and porting path for corresponding hybrid pads which supplement a fluid film with additional lubrication pressure and flow. These journal bearings with hybrid pad locations and/or porting paths can include drive-side pressure loaded journal bearing 35, driven-side stationary journal bearing 36, and driven-side pressure-loaded journal bearing 37 (each shown in FIGS. 3A and 3B). Unless otherwise specified, the structure of a particular element is similar or identical to that which is described relative to drive-side stationary journal bearing 34. Each example will be described in turn.

Drive-Side Pressure Loaded Journal Bearing 35

Figure 7A:
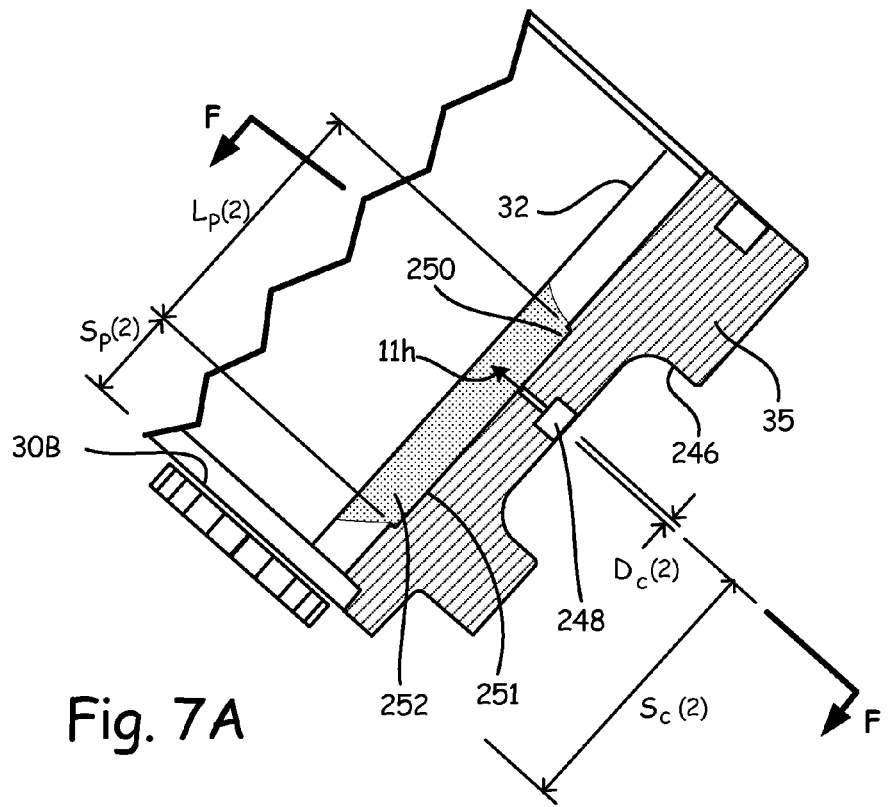
FIG. 7A is a cross-sectional view of a drive-side pressure loaded journal bearing taken along line B-B of FIG. 2.
Figure 7B:
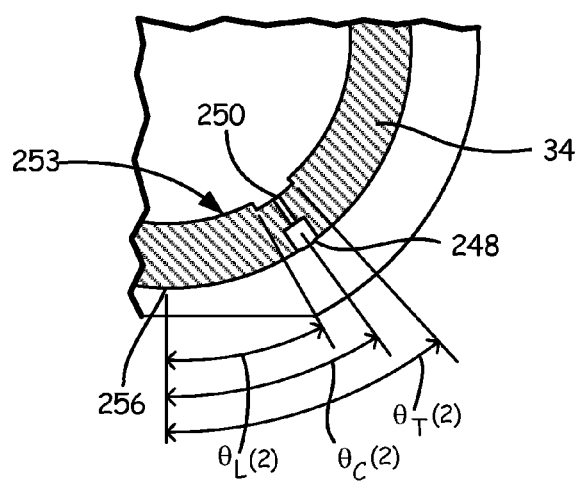
FIG. 7B is another cross-sectional view of the drive-side pressure loaded journal bearing taken along line F-F of FIG. 7A.

FIGS. 7A and 7B are cross-sectional views of drive-side pressure loaded journal bearing 35. In the example shown, drive-side pressure loaded journal bearing 35 is a second one of the plurality of journal bearings which can be used for supporting portions of gear pump 10. Similar to the first example, the sectional view in FIG. 7A is taken along line B-B of FIG. 2, while the view in FIG. 7B is taken along line F-F of FIG. 7A.

Second porting path 240 can be made up of second discharge face cut 242 (shown in FIG. 3A) on drive-side pressure loaded journal bearing 35, second axial hole 244 (also shown in FIG. 3A) through bearing 35, second radial spool cut 246 on bearing 35, and second capillary port 248. Second capillary port 248 can have diameter $D_C(2)$, as well as axial spacing $S_C(2)$ (measured from gear face 30B) and capillary port angular location $\theta_C(2)$ (measured from second bearing flat 256 shown in FIG. 2). As also shown below, second hybrid pad 250 and its corresponding second hybrid pad recess location 251 can have axial length $L_P(2)$ and axial spacing $S_P(2)$ (spacing measured from gear face 30B), while an angular location for second hybrid pad 250 and/or second hybrid pad recess location 251 can be defined at least in part via leading edge angular location $\theta_L(2)$, and trailing edge angular location $\theta_T(2)$.

Like bearing 34, the load carrying capacity of the second one of the plurality of journal bearings, drive-side pressure loaded journal bearing 35, can additionally or alternatively be increased by delivering high pressure fluid 11h from outlet 16 to form second hybrid pad 250 at the corresponding second hybrid pad recess location 251. A portion of the high-pressure fluid 11h exiting from outlet 16 can additionally or alternatively be supplied through second porting path 240. Specifically, high-pressure fluid 11h can be discharged from outlet 16 at second discharge face cut 242, passing through second axial hole 244 (both shown in FIG. 3A) to second radial spool cut 246. Once at second radial spool cut 246, fluid 11h then can travel circumferentially around second radial spool cut 246 and into second capillary port 248, as shown in FIG. 3B.

As shown in FIGS. 3B, 7A, and 7B, second capillary port 248 can extend through drive-side pressure loaded journal bearing 35 from second radial spool cut 246. Therefore, when high-pressure fluid 11h enters into second capillary port 248 from second radial spool cut 246, it can be delivered to a second hybrid pad recess location 251 to form second hybrid pad 250. As in the first example (shown in FIGS. 4A and 4B), high pressure fluid 11h can additionally or alternatively be injected to supplement second fluid film 252 at second fluid film location 253. In the illustrated embodiment of drive-side pressure loaded bearing 35, second capillary port 248 has on-center axial spacing $S_C(2)$ of approximately 0.800 inch (2.032 cm) from second drive gear face 30B and diameter $D_C(2)$ of approximately 0.023 inch (0.058 cm). However, manufacturing tolerances for diameter $D_C(2)$ can include up to +0.004 inch (0.010 cm). Second capillary port 248 can be in fluid communication anywhere along the recess location 251 for second hybrid pad 250. For example, second capillary port 248 can be configured so as to be centered on second hybrid pad 250 and/or second hybrid pad recess location 251, or as shown in other illustrated embodiments, second capillary port 248 can be configured to be offset from a center of second hybrid pad 250 and/or second hybrid pad recess location 251. As shown in this example, second capillary port 248 is offset from a center of second hybrid pad 250 and second hybrid pad recess location 251 because second capillary port 248 can be located at or near where it is most cost-effective to machine, given a geometry of bearing 35.

In the illustrated embodiment, second hybrid pad 250 (and corresponding second recess location 251) has axial length $L_P(2)$ generally mirroring axial length $L_P(1)$ of first hybrid pad 150, approximately 0.540 inch (1.37 cm). It also has second axial spacing $S_P(2)$ similar to first axial spacing $S_P(1)$, approximately 0.30 inch (0.76 cm), from second drive gear face 30B as measured from an edge of second hybrid pad 250 closest to face 30B. Manufacturing tolerances for second axial length $L_P(2)$ and second axial spacing $S_P(2)$ can similarly include ±0.01 inch (0.025 cm).

Second hybrid pad 250 can be again in a similar or mirror-image location (relative to gear faces 30A, 30B shown in FIG. 2) as the location of first hybrid pad 150 (shown in FIGS. 4A-4B, and 5). The location can therefore be such that second hybrid pad 250 can have a minimum leading edge angular location ($\theta_{Lmin}(2)$) of 30.0°, and a maximum trailing edge angular location ($\theta_{Tmax}(2)$) of 42.0° (i.e., all of second hybrid pad 250 can be within an angular location range of 30.0°-42.0°, but need not extend fully within this range). In one embodiment (shown in FIG. 7B), second hybrid pad 250 extends fully within the angular location range of 30.0°-42.0°, such that $\theta_{Lmin}(2)$ is equal to $\theta_L(2)$ and $\theta_{Tmax}(2)$ is equal to $\theta_T(2)$. In other embodiments, second hybrid pad 250 can have a leading edge angular location $\theta_L(2)$ of 32°, and a trailing edge angular location $\theta_T(2)$ of 42°. In yet further embodiments, second hybrid pad 250 can have a leading edge angular location $\theta_L(2)$ of 36°, and a trailing edge angular location $\theta_T(2)$ of 40°. As shown, second hybrid pad 250 is centered at angular location $\theta_P(2)$ of 36° (shown in FIG. 8). More generally, to provide suitable fluid film augmentation with acceptable leakage in gear pump applications, other embodiments can have an overall second hybrid pad 250 width of about 8°-12°, and/or second hybrid pad 250 can be centered at locations other than 36° as long as all of second hybrid pad 250 is axially located within the angular location range of 31.0°-43.0°. With second hybrid pad 250 in an angular location range of 31.0°-43.0°, second capillary port 248 has angular location $\theta_C(2)$ on bearing 35 of approximately 36.0°, as measured from a centerline of second bearing flat 256.

In use, second fluid film 252, as shown in FIG. 7A, can be disposed at second fluid film location 253 between an inner surface of drive-side pressure loaded journal bearing 35 and an outer surface of first/drive gear shaft 32. Here, fluid 11 also creates second fluid film 252, because as gear pump 10 begins to operate, a portion of fluid 11 from within housing 12 is axially drawn to second fluid film location 253 shown in FIG. 7A. By injecting high pressure fluid 11h into second hybrid pad 250, adjacent to fluid film location 253, second fluid film 252 is supplemented, and the resulting pressure of second fluid film 252 is increased compared to a pressure of fluid film 252 drawn from housing 12 alone. Therefore, the load carrying capacity of drive-side pressure loaded journal bearing 35 is increased compared to conventional gear pump bearings. In the illustrated embodiment, pressurizing or supplementing fluid film 252 with high pressure fluid 11h increases a thickness of fluid film 252 by approximately 0.000012 inch (0.000030 cm); as such, bearing 35 can carry greater loads without risk of bearing touchdown.

Figure 8:
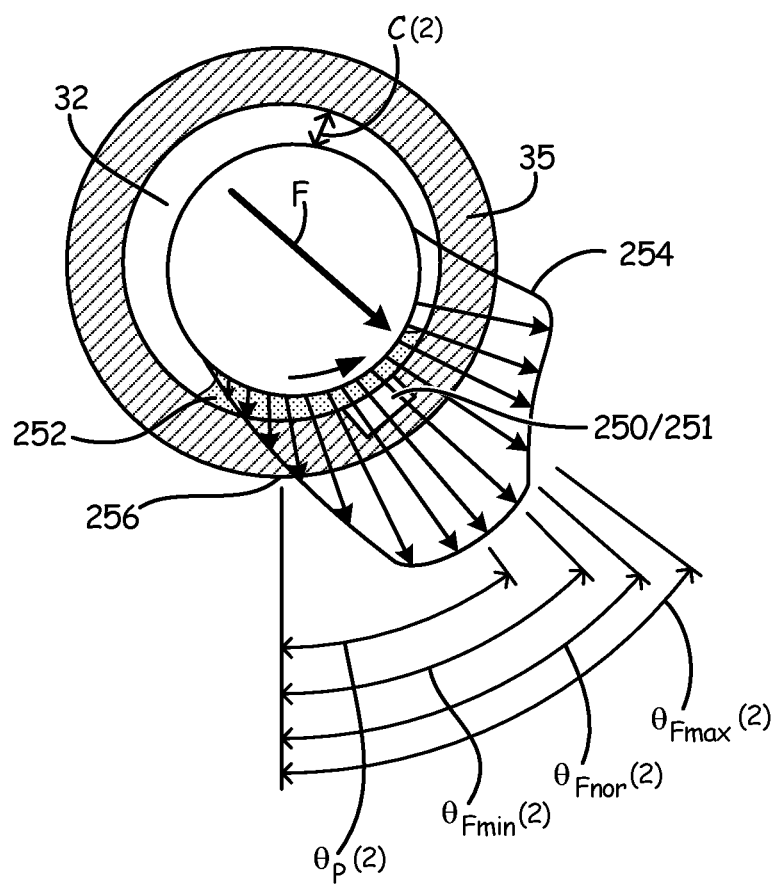
FIG. 8 is schematic diagram showing a pressure distribution profile of the drive-side pressure loaded journal bearing which includes a second hybrid pad.

FIG. 8 shows a second bearing pressure distribution profile 254 when second hybrid pad 250 is properly configured. Angular locations are measured from second bearing flat 256. Thus the angular locations with respect to drive-side pressure loaded bearing 35 are clockwise from second bearing flat 256 when viewed from gear face 30B toward adjacent bearing 35, and are counter-clockwise when viewed toward gear face 30B.

Load F(2), which represents a summation of loads acting on drive gear 18 can have a maximum value ranging in location from maximum angular location $\theta_{Fmax}(2)$ to minimum angular location $\theta_{Fmin}(2)$. Angular location $\theta_{Fnor}(2)$ is a normalized location for the range of angles at which load F(2) can act. For the illustrated second pressure distribution profile 254 of bearing 35, first/drive gear shaft 32 rotates at a speed of approximately 8935 RPM. Maximum diametral clearance C(2) between an inner surface of drive-side pressure loaded bearing 35 and an outer surface of first/drive gear shaft 32 (e.g., at a longitudinal end opposite that of the longitudinal end disposed in drive-side stationary bearing 34) is approximately 0.0039 inch (0.00991 cm). In the illustrated embodiment, load F(2) can be applied at angular locations ranging from $\theta_{Fmin}(2)$ of approximately 43.4° to $\theta_{Fmax}(2)$ of approximately 53.0°, with load F(2) having normalized angular location $\theta_{Fnor}(2)$ of 49.2°. Maximum load F(2) is similarly about 594 $lb_f/in^2$ (4095 kPa) in magnitude and represents the highest magnitude loading to be experienced by drive-side pressure loaded bearing 35 in the illustrative gear pump application.

By properly configuring second hybrid pad 250 and injecting correct amounts of high-pressure fluid 11h to supplement second fluid film 252 (via second hybrid pad 250), maximum load F(2) can be carried by bearing 35 through second fluid film 252 without risk of failure (i.e., touchdown of bearing 35). Like the previous example, a proper configuration of second hybrid pad 250 can be a function of several factors, including, for example, a rotational speed of first gear shaft 32, a magnitude and angle of radial load F(2), maximum diametral clearance C(2) between an inner surface of bearing 35 and an outer surface of first gear shaft 32, a geometry of first gear shaft 32 relative to bearing 35, as well as properties (e.g., density, viscosity, specific heat) of second fluid film 252. An improperly configured second hybrid pad 250 can vent pressure of second fluid film 252, resulting in decreased load carrying capability of bearing 35. Also, an improperly configured second hybrid pad 250 can result in excessive leakage of gear pump 10, preventing it from meeting flow requirements.

With respect to performance of second fluid film 252 and leakage of gear pump 10, as a function of the configuration of second hybrid pad 250, this can be seen by referring back to the graph and description of FIG. 6, which reflects maximum load F(2) (shown in FIG. 8) of approximately 594 $lb_f/in^2$ (4095 kPa) (i.e., the maximum, most challenging loading scenario for drive-side pressure loaded journal bearing 35 under the given gear pump 10 application).

Driven-Side Stationary Journal Bearing 36

Figure 9A:
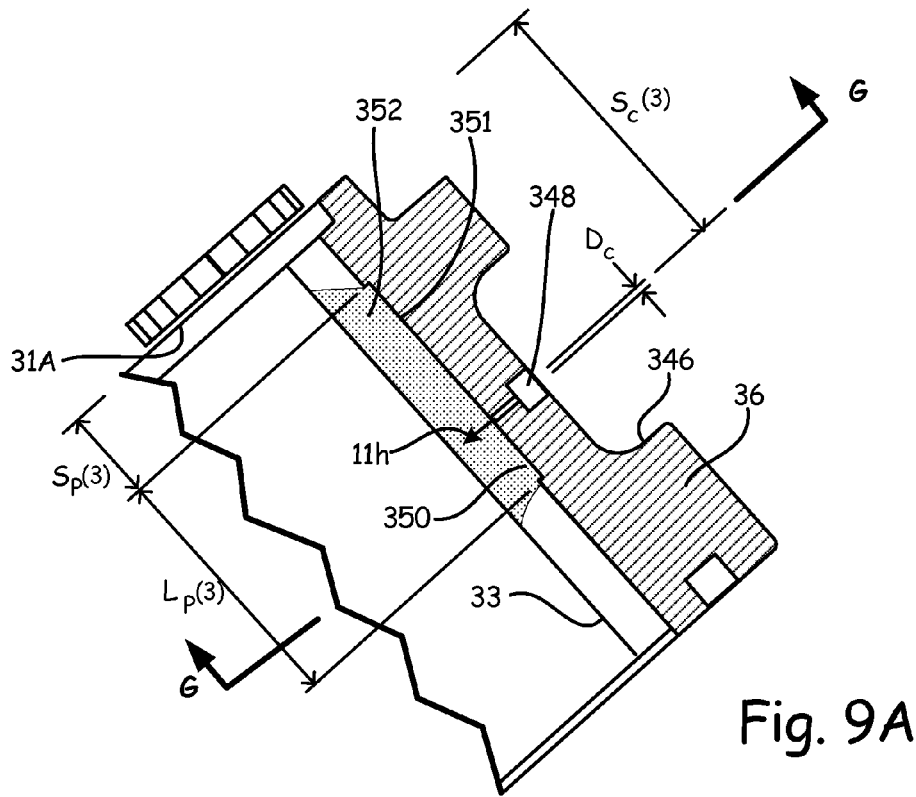
FIG. 9A is a cross-sectional view of a driven-side stationary journal bearing taken along line C-C of FIG. 2.
Figure 9B:
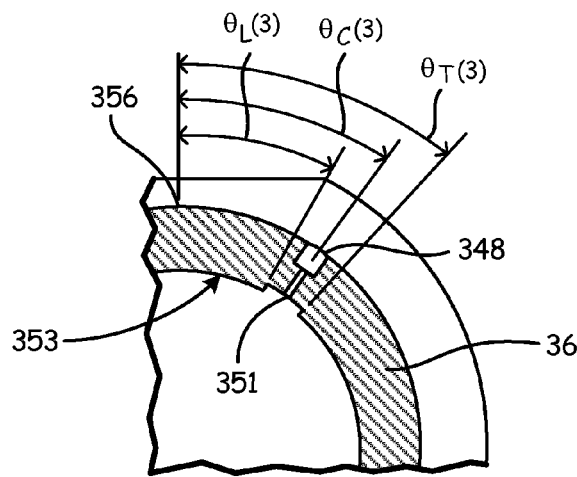
FIG. 9B is another cross-sectional view of the driven-side stationary journal bearing taken along line G-G of FIG. 9A.

FIGS. 9A and 9B are cross-sectional views of driven-side stationary journal bearing 36. In the example shown, driven-side stationary journal bearing 36 is a third one of the plurality of journal bearings which can be used for supporting portions of gear pump 10. Similar to the first example, the sectional view in FIG. 9A is taken along line C-C of FIG. 2, while the view in FIG. 9B is taken along line G-G of FIG. 9A.

Third porting path 340 can be made up of third discharge face cut 342 (shown in FIG. 3A) on driven-side stationary journal bearing 36, third axial hole 344 (also shown in FIG. 3A) through bearing 36, third radial spool cut 346 on bearing 36, and third capillary port 348. Third capillary port 348 can have diameter $D_C(3)$, as well as axial spacing $S_C(3)$ (measured from gear face 31A) and capillary port angular location $\theta_C(3)$ (measured from third bearing flat 356 shown in FIG. 2). As also shown below, third hybrid pad 350 and its corresponding third hybrid pad recess location 351 can have axial length $L_P(3)$ and axial spacing $S_P(3)$ (spacing measured from gear face 31A), while an angular location for third hybrid pad 350 and/or third hybrid pad recess location 351 can be defined at least in part via leading edge angular location $\theta_L(3)$, and trailing edge angular location $\theta_T(3)$.

Like bearings 34 and 35, the load carrying capacity of the third one of the plurality of journal bearings, driven-side stationary journal bearing 36, can additionally or alternatively be increased by delivering high pressure fluid 11h from outlet 16 to form third hybrid pad 350 at the corresponding third hybrid pad recess location 351. A portion of the high-pressure fluid 11h exiting from outlet 16 can additionally or alternatively be supplied through third porting path 340. Specifically, high-pressure fluid 11h can be discharged from outlet 16 at third discharge face cut 342, passing through third axial hole 344 (both shown in FIG. 3A) to third radial spool cut 346. At third radial spool cut 346, fluid 11h then can travel circumferentially around third radial spool cut 346 and into third capillary port 348, as shown in FIG. 3B.

As shown in FIGS. 3B, 9A, and 9B, third capillary port 348 can extend through drive-side stationary journal bearing 36 from third radial spool cut 346. Therefore, when high-pressure fluid 11h enters into third capillary port 348 from third radial spool cut 346, it can be delivered to a third hybrid pad recess location 351 to form third hybrid pad 350. As in the first and second examples (shown in FIGS. 4A-4B and 7A-7B), high pressure fluid 11h can additionally or alternatively be injected to supplement third fluid film 352 at third fluid film location 353. In the illustrated embodiment of driven-side stationary bearing 36, third capillary port 348 has on-center axial spacing $S_C(3)$ of approximately 0.593 inch (1.506 cm) from third drive gear face 31A and diameter $D_C(3)$ of approximately 0.023 inch (0.058 cm). However, manufacturing tolerances for diameter $D_C(3)$ can include up to +0.004 inch (0.010 cm). Third capillary port 348 can be in fluid communication anywhere along the recess location 351 for third hybrid pad 350. For example, third capillary port 348 can be configured so as to be centered on third hybrid pad 350 and/or third hybrid pad recess location 351, or as shown in other illustrated embodiments, third capillary port 348 can be configured to be offset from a center of third hybrid pad 350 and/or third hybrid pad recess location 351. As shown in this example, third capillary port 348 is offset from a center of third hybrid pad 350 and third hybrid pad recess location 351 because third capillary port 348 can be located at or near where it is most cost-effective to machine, given a geometry of bearing 36.

In the illustrated embodiment, third hybrid pad 350 (and corresponding third recess location 351) has axial length $L_P(3)$ of approximately 0.540 inch (1.37 cm). It also has third axial spacing $S_P(3)$ of approximately 0.30 inch (0.76 cm) from third drive gear face 31A as measured from an edge of third hybrid pad 350 closest to face 31A, while manufacturing tolerances for third axial length $L_P(3)$ and third axial spacing $S_P(3)$ can include ±0.01 inch (0.025 cm). Third hybrid pad 350 has a corresponding recess location 351 such that third hybrid pad 350 has a minimum leading edge angular location $(\theta_{Lmin}(3))$ of 41.0°, and a maximum trailing edge angular location $(\theta_{Tmax}(3))$ of 43.0° (i.e., all of third hybrid pad 350 is within an angular location range of 35.0°-47.0°, but need not extend fully within this range). In one embodiment (shown in FIG. 9B), third hybrid pad 350 extends fully within the angular location range of 35.0°-47.0°, such that $\theta_{Lmin}(3)$ is equal to $\theta_L(3)$ and $\theta_{Tmax}(3)$ is equal to $\theta_T(3)$. In other embodiments, third hybrid pad 350 can have a leading edge angular location $\theta_L(3)$ of 36°, and a trailing edge angular location $\theta_T(3)$ of 46°. In yet further embodiments, third hybrid pad 350 can have a leading edge angular location $\theta_L(3)$ of 39°, and a trailing edge angular location $\theta_T(3)$ of 43°. As shown, third hybrid pad 350 is centered at angular location $\theta_P(3)$ of 41° (shown in FIG. 10). More generally, to provide suitable fluid film augmentation with acceptable leakage in gear pump applications, other embodiments can have an overall third hybrid pad 350 width of about 8°-12°, and/or third hybrid pad 350 can be centered at locations other than 41° as long as all of third hybrid pad 350 is axially located within the angular location range of 35.0°-47.0°. With third hybrid pad 350 and/or third hybrid pad recess location 351 in an angular location range of 35.0°-47.0°, an angular location $\theta_C(3)$ of third capillary port 348 on bearing 36 can be about 41.0°, measured from a centerline of third bearing flat 356.

In use, third fluid film 352, as shown in FIG. 9A, can be disposed at third fluid film location 353 between an inner surface of driven-side stationary journal bearing 36 and an outer surface of second/driven gear shaft 33. Here, fluid 11 also creates third fluid film 352, since a portion of fluid 11 from within housing 12 is axially drawn to third fluid film location 353 as gear pump 10 begins to operate. By injecting high pressure fluid 11h into third hybrid pad 350, adjacent to third fluid film location 353, third fluid film 352 is supplemented, and the resulting pressure of third fluid film 352 is increased compared to a pressure of fluid film 352 drawn from housing 12 alone. Therefore, the load carrying capacity of driven-side stationary journal bearing 36 is increased compared to conventional gear pump bearings. In the illustrated embodiment, pressurizing or supplementing fluid film 352 with high pressure fluid 11h increases a thickness of fluid film 352 by approximately 0.0000075 inch (0.0000190 cm), and as a result, bearing 36 can carry greater loads without risk of a bearing touchdown.

Figure 10:
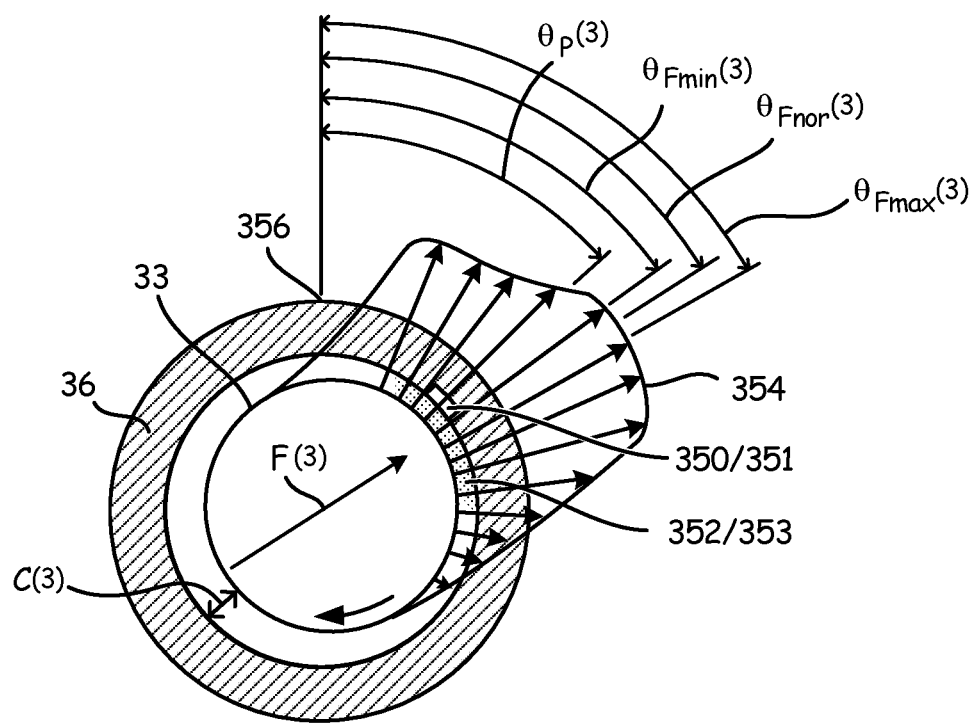
FIG. 10 is schematic diagram showing a pressure distribution profile of the driven-side stationary journal bearing which includes a third hybrid pad.

FIG. 10 shows third bearing pressure distribution profile 354 when third hybrid pad 350 is properly configured. Angular locations are measured from third bearing flat 356. Thus an angular location with respect to driven-side stationary bearing 36 is counter-clockwise from third bearing flat 356 when viewed from gear face 31A adjacent bearing 36, and clockwise when viewed toward gear face 31A as in FIG. 9B.

Load F(3), which represents a summation of loads acting on driven gear 20 can have a maximum value ranging in location from maximum angular location $\theta_{Fmax}(3)$ to minimum angular location $\theta_{Fmin}(3)$. Angular location $\theta_{Fnor}(3)$ is a normalized location for the range of angles at which load F(3) can act. For the illustrated third pressure distribution profile 354 of bearing 36, second/driven gear shaft 33 rotates at a speed of approximately 8935 RPM. Maximum diametral clearance C(3) between an inner surface of driven-side stationary bearing 36 and an outer surface of second/driven gear shaft 33 (e.g., at one longitudinal end) is approximately 0.0039 inch (0.00991 cm). In the illustrated embodiment, load F(3) can be applied at angular locations ranging from $\theta_{Fmin}(3)$ of approximately 50.4° to $\theta_{Fmax}(3)$ of approximately 61.4°, with load F(3) having normalized angular location $\theta_{Fnor}(3)$ of 55.9°. Maximum load F(3) is approximately 690 lb/in² (4757 kPa) in magnitude and represents the highest magnitude loading to be experienced by driven-side stationary bearing 36 in the illustrative gear pump application.

By properly configuring third hybrid pad 350 and injecting correct amounts of high-pressure fluid 11h to supplement third fluid film 352 (via third hybrid pad 350), maximum load F(3) can be carried by bearing 36 through third fluid film 352 without risk of failure (i.e., touchdown of bearing 36). Like previous examples, a proper configuration of third hybrid pad 350 can be a function of several factors, including, for example, a rotational speed of second gear shaft 33, a magnitude and location of radial load F(3), a maximum diametral clearance C(3) between an inner surface of bearing 36 and an outer surface of second gear shaft 33, a geometry of second gear shaft 33 relative to bearing 36, as well as properties (e.g., density, viscosity, specific heat) of third fluid film 352. An improperly configured third hybrid pad 350 can vent pressure of third fluid film 352, instead of adding to its pressure, resulting in a decrease in load carrying capability of bearing 36. Also, an improperly configured third hybrid pad 350 can result in excessive leakage of gear pump 10, preventing it from meeting flow requirements.

Figure 11:
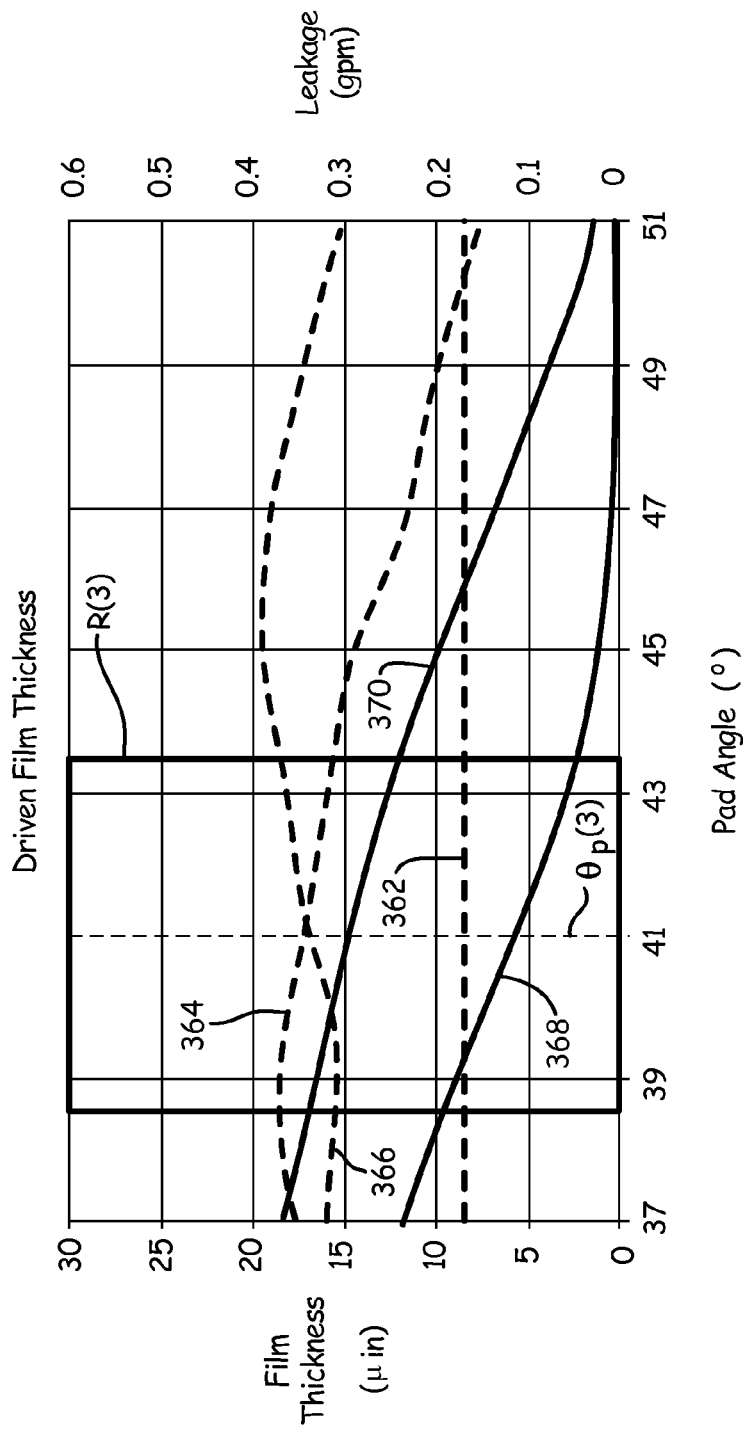
FIG. 11 is graph illustrating fluid film performance of the driven-side stationary journal bearing as a function of a third hybrid pad configuration.

FIG. 11 graphically illustrates both performance of third fluid film 352, and leakage of gear pump 10 as a function of the configuration of third hybrid pad 350. FIG. 11 data reflects maximum load F(3) (shown in FIG. 10) of approximately 690 lb/in² (4757 kPa) (i.e., the maximum, most challenging loading scenario for driven-side stationary journal bearing 36 under the given gear pump 10 application). Here, for load F(3), a minimum angular location $\theta_{Fmin}(3)$ is approximately 50.4°, and maximum angular location $\theta_{Fmax}(3)$ is approximately 61.4°. A horizontal axis indicates angular location of third hybrid pad 350, as measured to a center of third hybrid pad 350 from third bearing flat 356 (in a direction of rotation, i.e. toward inlet 14 and away from outlet 16). Included on the horizontal axis is chosen hybrid pad center angular location $\theta_P(3)$ (hybrid pad 350 is centered at an angular location of 41°), as well as region R(3) which represents a range of third hybrid pad 350 center angular location $\theta_P(3)$ based on manufacturing tolerances (with all of third hybrid pad 350 axially within an angular location range of 35.0°-47.0°, as discussed previously). Region R(3) encompasses third hybrid pad 350 center angular locations $\theta_P(3)$ of approximately 38.5° to approximately 43.5°. A left vertical axis indicates a thickness of third fluid film 352 versus angular location of third hybrid pad 350, given by dashed plot lines. Thickness of third fluid film 352 is indicated by dashed lines and which include baseline plot 362 where no hybrid pad is used on bearing 36, plot 364 where third hybrid pad 350 is used and load F(3) is at a minimum load angular location $\theta_{Fmin}(3)$, and plot 366 where third hybrid pad 350 is used and load F(3) is at a maximum load angular location $\theta_{Fmax}(3)$.

Plot 362 (no hybrid pad) shows a thickness of third fluid film 352 is approximately 9.2 microinches (0.234 µm) at all angular positions of load F(3). When third hybrid pad 350 is configured on bearing 36 at angular location $\theta_P(3)$ of about 41°, both plot 364 (minimum load angle) and plot 366 (maximum load angle) show a thickness of third fluid film 352 at or near $\theta_P(3)$ of approximately 17.0 microinches (0.432 µm)±0.2 microinches (0.005 µm). Therefore, by pressurizing and supplementing third fluid film 352 with high pressure fluid 11h at hybrid pad 350 configured at angular location $\theta_P(3)$ of about 41°, bearing 36 has a thicker third fluid film 352 and thus can carry a greater load as compared to bearing 36 without third hybrid pad 350 (plot 362). It can also maintain third fluid film 352 at a thickness great enough to support maximum load F(3) over a range of angles. Furthermore, designing gear pump 10 such that hybrid pad 350 is located at or about angular location $\theta_P(3)$ of about 41° allows for manufacturing tolerances within region R(3) which still permit bearing 36 to perform over a range on angles of maximum load F(3) because $\theta_P(3)$ is near a maximum thickness of third fluid film 352, yet eliminates a risk of manufacturing tolerances leading to a location of third hybrid pad 350 where the thickness of third fluid film 352 significantly decreases.

A right vertical axis of FIG. 11 indicates leakage of gear pump 10 at the various third hybrid pad 350 angular locations on the horizontal axis, given by solid plot lines. Leakage of gear pump 10 represents a loss of flow capacity of gear pump 10 due to some of fluid 11h from discharge 16 being diverted from one or more destinations and instead delivered to third hybrid pad 350. Thus, when no hybrid pad is used, additional leakage of gear pump 10 is effectively zero. Leakage of gear pump 10 (solid plot lines) include plot 368 where third hybrid pad 350 is used and load F(3) is at a minimum load angular location $\theta_{Fmin}(3)$, and plot 370 where third hybrid pad 350 is used and load F(3) is at a maximum load angular location $\theta_{Fmax}(3)$. As can be seen, third hybrid pad 350 configuration also significantly affects leakage of gear pump 10. When third hybrid pad 350 is configured at angular location $\theta_P(3)$ (37°), plot 368 (minimum load angle) shows gear pump 10 leakage is approximately 0.06 gpm (0.23 l/min) at $\theta_P(3)$, while plot 370 (maximum load angle) shows gear pump 10 leakage is approximately 0.29 gpm (1.10 l/min) at $\theta_P(3)$. Therefore, by configuring third hybrid pad 350 at or about angular location $\theta_P(3)$ of 41°, gear pump 10 leakage is kept within a manageable range over the range of load angles, which can allow gear pump 10 to meet flow requirements under the various loads without compromising thickness of third fluid film 352 and in turn, the load carrying capacity of bearing 36 over the angular range of load F(3). Although altering configuration of third hybrid pad 350 forward by a few angular degrees can decrease leakage, this configuration can also excessively vent pressure of third fluid film 352 (plot 364), decreasing thickness of third fluid film 352, and reduce load carrying capacity for load F(3) over at least some angular ranges. On the other hand, altering configuration of third hybrid pad 350 backward by a few degrees can result in excessive leakage of gear pump 10 and prevent gear pump 10 from meeting flow requirements.

Driven-Side Pressure Loaded Journal Bearing 37

Figure 12A:
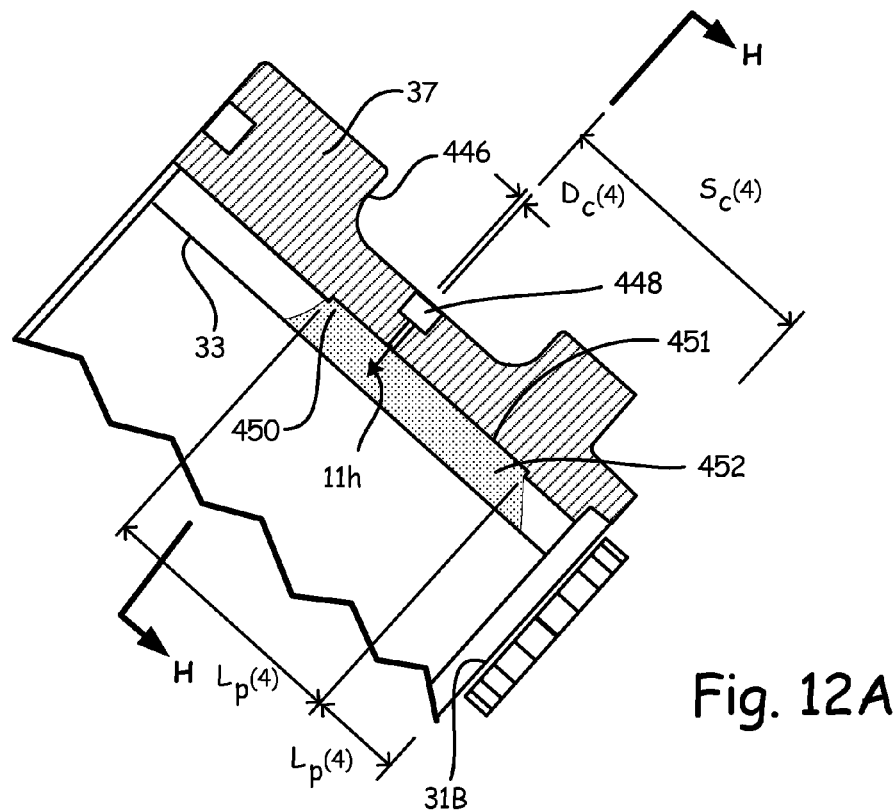
FIG. 12A is a cross-sectional view of a driven-side pressure loaded journal bearing taken along line D-D of FIG. 2.
Figure 12B:
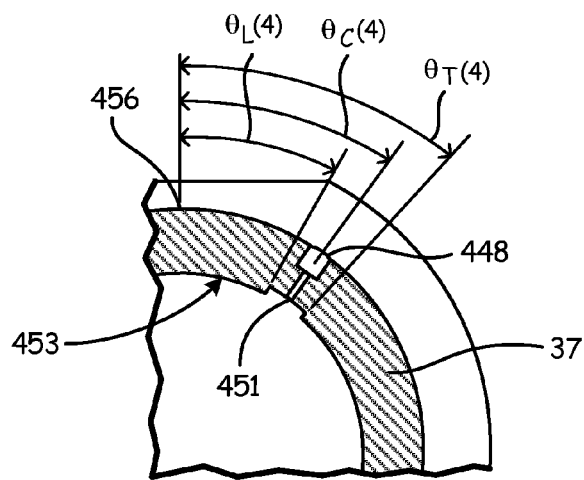
FIG. 12B is another cross-sectional view of the driven-side pressure loaded journal bearing taken along line H-H of FIG. 12A.

FIGS. 12A and 12B are cross-sectional views of driven-side pressure loaded journal bearing 37. In the example shown, driven-side pressure loaded journal bearing 37 is a fourth one of the plurality of journal bearings which can be used for supporting portions of gear pump 10. Similar to the previous examples, the sectional view in FIG. 12A is taken along line D-D of FIG. 2, while the view in FIG. 12B is taken along line H-H of FIG. 12A.

Fourth porting path 440 can be made up of fourth discharge face cut 442 (shown in FIG. 3A) on driven-side pressure loaded journal bearing 37, fourth axial hole 444 (also shown in FIG. 3A) through bearing 37, fourth radial spool cut 446 on bearing 37, and fourth capillary port 448. Fourth capillary port 448 can have diameter $D_C(4)$, as well as axial spacing $S_C(4)$ (measured from gear face 31B) and capillary port angular location $\theta_C(4)$ (measured from fourth bearing flat 456 shown in FIG. 2). As shown below, fourth hybrid pad 450 and its corresponding fourth hybrid pad recess location 451 can have axial length $L_P(4)$ and axial spacing $S_P(4)$ (spacing measured from gear face 31B), while an angular location for fourth hybrid pad 450 can be defined at least in part via leading edge angular location $\theta_L(4)$, and trailing edge angular location $\theta_T(4)$.

Like bearings 34, 35, and 36, load carrying capacity of a fourth one of a plurality of journal bearings, driven-side pressure loaded journal bearing 37, additionally or alternatively can be increased by delivering high pressure fluid 11h from outlet 16 to form fourth hybrid pad 450 at the corresponding fourth hybrid pad recess location 451. A portion of the high-pressure fluid 11h exiting from outlet 16 can additionally or alternatively be supplied through fourth porting path 440. Specifically, high-pressure fluid 11h can be discharged from outlet 16 at fourth discharge face cut 442, passing through fourth axial hole 444 (both shown in FIG. 3A) to fourth radial spool cut 446. Once at fourth radial spool cut 446, fluid 11*h* then can travel circumferentially around fourth radial spool cut 446 and into fourth capillary port 448, as shown in FIG. 3B.

As shown in FIGS. 3B, 12A, and 12B, fourth capillary port 448 can extend through drive-side pressure loaded journal bearing 37 from fourth radial spool cut 446. Therefore, when high-pressure fluid 11*h* enters into fourth capillary port 448 from fourth radial spool cut 446, it can be delivered to a fourth hybrid pad recess location 451 to form fourth hybrid pad 450. As in the other examples (shown in FIGS. 4A-4B, 7A-7B, and 9A-9B), high pressure fluid 11*h* can additionally or alternatively be injected to supplement fourth fluid film 452 at fourth fluid film location 453. In the illustrated embodiment of driven-side pressure loaded bearing 37, fourth capillary port 448 has on-center axial spacing $S_C(4)$ of approximately 0.800 inch (2.032 cm) from fourth drive gear face 31B and diameter $D_C(4)$ of approximately 0.023 inch (0.058 cm). However, manufacturing tolerances for diameter $D_C(4)$ can include up to +0.004 inch (0.010 cm). Fourth capillary port 448 can be in fluid communication anywhere along the recess location 451 for fourth hybrid pad 450 and/or fourth hybrid pad recess location 451. For example, fourth capillary port 448 can be configured so as to be centered on fourth hybrid pad 450 and/or fourth hybrid pad recess location 451, or as shown in other illustrated embodiments, fourth capillary port 448 can be configured to be offset from a center of fourth hybrid pad 450 and/or fourth hybrid pad recess location 451. As shown in this example, fourth capillary port 448 is offset from a center of fourth hybrid pad 450 because fourth capillary port 348 can be located at or near where it is most cost-effective to machine, given a geometry of bearing 37.

In the illustrated embodiment, fourth hybrid pad 450 (and corresponding fourth recess location 451) has axial length $L_P(4)$ generally mirroring axial length Lp(3) of third hybrid pad 350, approximately 0.540 inch (1.37 cm). It also has fourth axial spacing $S_P(4)$ similar to third axial spacing $S_P(3)$, approximately 0.30 inch (0.76 cm) as measured from an edge of fourth hybrid pad 450 and/or fourth hybrid pad recess location 451 closest to face 31B. Manufacturing tolerances for fourth axial length $L_P(4)$ and fourth axial spacing $S_P(4)$ can similarly include ±0.01 inch (0.025 cm).

Fourth hybrid pad 450 has a corresponding location which can be, again, in a similar or mirror-image location (relative to gear faces 31A, 31B shown in FIG. 2) as the location of third hybrid pad 350 (shown in FIGS. 9A-9B, and 10). The location can therefore be such that fourth hybrid pad 450 has a minimum leading edge angular location $(\theta_{Lmin}(4))$ of 35.0°, and a maximum trailing edge angular location $(\theta_{Tmax}(4))$ of 47.0° (i.e., all of fourth hybrid pad 450 is within an angular location range of 35.0°-47.0°, but need not extend fully within this range). In one embodiment (shown in FIG. 12B), fourth hybrid pad 450 extends fully within the angular location range of 35.0°-47.0°, such that $\theta_{Lmin}(4)$ is equal to $\theta_L(4)$ and $\theta_{Tmax}(4)$ is equal to $\theta_T(4)$. In other embodiments, fourth hybrid pad 450 can have a leading edge angular location $\theta_L(4)$ of 36°, and a trailing edge angular location $\theta_T(4)$ of 46°. In yet further embodiments, fourth hybrid pad 450 can have a leading edge angular location $\theta_L(4)$ of 38°, and a trailing edge angular location $\theta_T(4)$ of 44°. As shown, fourth hybrid pad 450 is centered at angular location $\theta_P(4)$ of 41° (shown in FIG. 13). More generally, to provide suitable fluid film augmentation with acceptable leakage in gear pump applications, other embodiments can have an overall fourth hybrid pad 450 width of about 8°-12°, and/or fourth hybrid pad 450 can be centered at locations other than 41° as long as all of fourth hybrid pad 450 is axially located within the angular location range of 35.0°-47.0°. With fourth hybrid pad 450 in an angular location range of 35.0°-47.0°, an angular location $\theta_C(4)$ of fourth capillary port 448 on bearing 37 can be about 41.0°, measured from a centerline of fourth bearing flat 456.

In use, fourth fluid film 452, as shown in FIG. 12A, can be disposed at fourth fluid film location 453 between an inner surface of driven-side stationary journal bearing 37 and an outer surface of second/driven gear shaft 33. Here, fluid 11 also creates fourth fluid film 452, since a portion of fluid 11 from within housing 12 is axially drawn to fourth fluid film location 453 as gear pump 10 begins to operate. By injecting high pressure fluid 11*h* into fourth hybrid pad 450, adjacent to fourth fluid film location 453, fourth fluid film 452 is supplemented, and the resulting pressure of fourth fluid film 452 is increased compared to a pressure of fluid film 452 drawn from housing 12 alone. Therefore, the load carrying capacity of driven-side stationary journal bearing 37 is increased compared to conventional gear pump bearings. In the illustrated embodiment, pressurizing or supplementing fluid film 452 with high pressure fluid 11*h* increases a thickness of fluid film 452 by approximately 0.000012 inch (0.000030 cm), and as a result, bearing 37 can carry greater loads without risk of a bearing touchdown.

Figure 13:
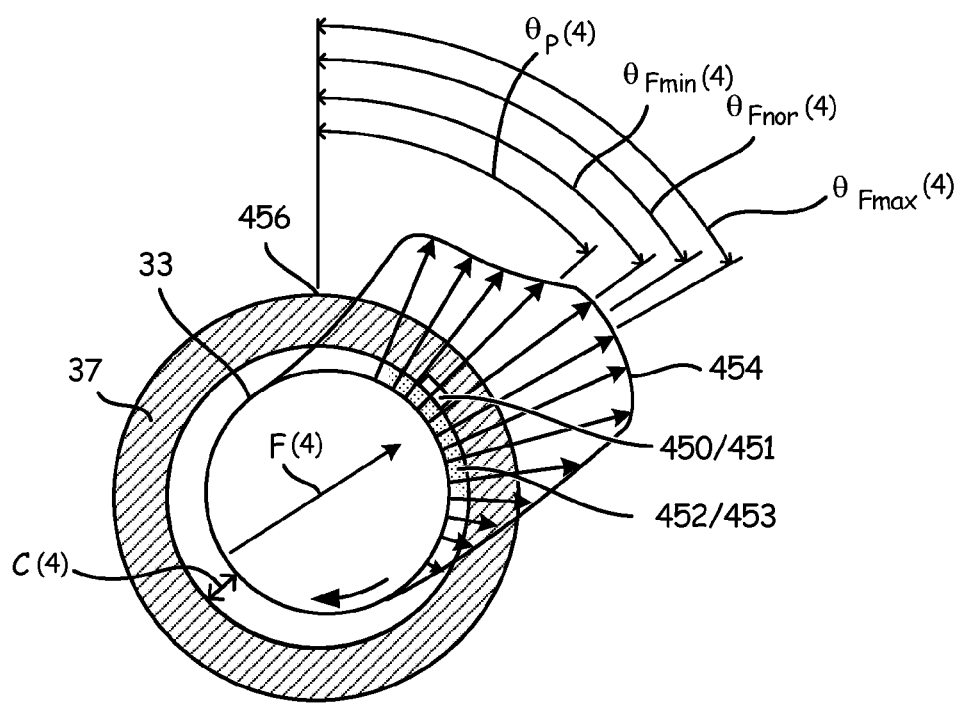
FIG. 13 is schematic diagram showing a pressure distribution profile of the driven-side pressure loaded journal bearing which includes a fourth hybrid pad.

FIG. 13 shows fourth bearing pressure distribution profile 454 when fourth hybrid pad 450 is properly configured. Angular locations are measured from fourth bearing flat 456. Thus an angular location with respect to driven-side pressure loaded bearing 37 is counter-clockwise from fourth bearing flat 456 when viewed from gear face 31B adjacent bearing 37, and clockwise when viewed toward gear face 31B as in FIG. 12B.

Load F(4), which represents a summation of loads acting on driven gear 20 can have a maximum value ranging in location from maximum angular location $\theta_{Fmax}(4)$ to minimum angular location $\theta_{Fmin}(4)$. Angular location $\theta_{Fnor}(4)$ is a normalized location for the range of angles at which load F(4) can act. For the illustrated fourth pressure distribution profile 454 of bearing 37, second/driven gear shaft 33 rotates at a speed of approximately 8935 RPM. Maximum diametral clearance C(4) between an inner surface of driven-side pressure loaded bearing 37 and an outer surface of second/driven gear shaft 33 (e.g., at one longitudinal end) is approximately 0.0039 inch (0.00991 cm). In the illustrated embodiment, load F(4) can be applied at angular locations ranging from $\theta_{Fmin}(4)$ of approximately 50.4° to $\theta_{Fmax}(4)$ of approximately 61.4°, with load F(4) having normalized angular location $\theta_{Fnor}(4)$ of 55.9°. Maximum load F(4) is approximately 690 lb/in² (4757 kPa) in magnitude and represents the highest magnitude loading to be experienced by driven-side pressure loaded bearing 37 in the illustrative gear pump application.

By properly configuring fourth hybrid pad 450 and injecting correct amounts of high-pressure fluid 11$h$ to supplement fourth fluid film 452 (via fourth hybrid pad 450), maximum load F(4) can be carried by bearing 37 through fourth fluid film 452 without risk of failure (i.e., touchdown of bearing 37). Like the previous examples, a proper configuration of fourth hybrid pad 450 can be a function of several factors, including, for example, a rotational speed of second gear shaft 33, a magnitude and angle of radial load F(4), maximum diametral clearance C(4) between an inner surface of bearing 37 and an outer surface of second gear shaft 33, a geometry of second gear shaft 33 relative to bearing 37, as well as properties (e.g., density, viscosity, specific heat) of fourth fluid film 452. An improperly configured fourth hybrid pad 450 can vent pressure of fourth fluid film 452, instead of adding pressure, resulting in a decrease in load carrying capability of bearing 37. Also, an improperly configured fourth hybrid pad 450 can result in excessive leakage of gear pump 10, preventing it from meeting flow requirements.

With respect to performance of fourth fluid film 452 and leakage of gear pump 10, as a function of the configuration of fourth hybrid pad 450, this can be seen by referring back to the graph and description of FIG. 11, which reflects maximum load F(4) (shown in FIG. 13) of approximately 690 lb/in² (4757 kPa) (i.e., the maximum, most challenging loading scenario for driven-side pressure loaded journal bearing 37 under the given gear pump 10 application).

The present inventors have discovered that at hybrid pad locations significantly less than the selected approximate angular location Op, thickness of the corresponding fluid film decreases, and thus so does load carrying capacity (and the ability to accommodate manufacturing tolerances) on the corresponding bearing. Furthermore, altering angular location $\theta_P$ by significantly more than a couple degrees greater than the selected location causes a decrease in thickness of supplemented fluid film for the minimum design load angle. Thus, varying hybrid pad configuration forward or backward by a few angular degrees significantly alters the thickness of fluid film over the range of angles of each load F, and thus ultimately the ability to prevent a bearing touchdown under all load ranges under design. The selected angular locations $\theta_P$ allow each bearing to support a maximum load F over the various angular locations designed to see maximum load F, while still taking into account manufacturing tolerances in corresponding region R when locating and sizing each hybrid pad.

Above is described a first example embodiment of a gear pump with journal bearings having one or more hybrid pads. These have been shown through simulations to work well together and have increased performance with reduced risk of bearing touchdown. The results are summarized in Tables 1 and 2.

TABLE 1

First Example Gear Pump Embodiment - Hybrid Pad Parameters:

| Bearing | Hybrid Pad | | | | |
| --- | --- | --- | --- | --- | --- |
| | Nominal Centerline | Minimum Leading Edge | Maximum Trailing Edge | Distance from Gear Face (in) | Pad Axial Length (in) |
| Drive-Side Stationary 34 | $\theta_P(1) \approx 36°$ | $\theta_{Lmin}(1) \approx 30°$ | $\theta_{Tmax}(1) \approx 42°$ | $S_P(1) \approx 0.300$ | $L_P(1) \approx 0.540$ |
| Drive-Side Floating 35 | $\theta_P(2) \approx 36°$ | $\theta_{Lmin}(2) \approx 30°$ | $\theta_{Tmax}(2) \approx 42°$ | $S_P(2) \approx 0.300$ | $L_P(2) \approx 0.540$ |
| Driven-Side Stationary 36 | $\theta_P(3) \approx 41°$ | $\theta_{Lmin}(3) \approx 35°$ | $\theta_{Tmax}(3) \approx 47°$ | $S_P(3) \approx 0.300$ | $L_P(3) \approx 0.540$ |
| Drive-Side Floating 37 | $\theta_P(4) \approx 41°$ | $\theta_{Lmin}(4) \approx 35°$ | $\theta_{Tmax}(4) \approx 47°$ | $S_P(4) \approx 0.300$ | $L_O(4) \approx 0.540$ |

TABLE 2

First Gear Pump Embodiment - Max Relief Parameters:

| Bearing | Pump Speed (RPM) | Max Relief | | | |
| --- | --- | --- | --- | --- | --- |
| | | Radial Load (psig/kPa) | Load Angle Range | Film thickness w/o pad (μin) | Film thickness with pad (μin) |
| Drive-Side Stationary 34 | 8935 | $F(1) \approx 594/4095$ | $\theta_F(1) \approx 43.4°-53.0°$ | 10.8 | 20.8 |
| Drive-Side Floating 35 | 8935 | $F(2) \approx 594/4095$ | $\theta_F(2) \approx 43.4°-53.0°$ | 10.8 | 20.8 |
| Driven-Side Stationary 36 | 8935 | $F(3) \approx 690/4757$ | $\theta_F(3) \approx 50.4°-61.4°$ | 9.2 | 16.7 |
| Drive-Side Floating 37 | 8935 | $F(4) \approx 690/4757$ | $\theta_F(4) \approx 50.4°-61.4°$ | 9.2 | 16.7 |

In addition, other combinations of hybrid pads have also been shown to work together with minimal leakage, increased operational capabilities, and reduced risk of bearing touchdown. Parameters for one alternative embodiment are shown in Tables 3 and 4 below.

TABLE 3

Second Example Gear Pump Embodiment - Hybrid Pad Parameters:

| Bearing | Hybrid Pad | | | | |
|---|---|---|---|---|---|
| | Nominal Centerline | Minimum Leading Edge | Maximum Trailing Edge | Distance from Gear Face (in) | Pad Axial Length (in) |
| Drive-Side Stationary 34 | $\theta_P(1) \approx 30°$ | $\theta_{Lmin}(1) \approx 24°$ | $\theta_{Tmax}(1) \approx 36°$ | $S_P(1) \approx 0.200$ | $L_P(1) \approx 0.544$ |
| Drive-Side Floating 35 | $\theta_P(2) \approx 30°$ | $\theta_{Lmin}(2) \approx 24°$ | $\theta_{Tmax}(2) \approx 36°$ | $S_P(2) \approx 0.200$ | $L_P(2) \approx 0.544$ |
| Driven-Side Stationary 36 | $\theta_P(3) \approx 46°$ | $\theta_{Lmin}(3) \approx 40°$ | $\theta_{Tmax}(3) \approx 52°$ | $S_P(3) \approx 0.200$ | $L_P(3) \approx 0.544$ |
| Drive-Side Floating 37 | $\theta_P(4) \approx 46°$ | $\theta_{Lmin}(4) \approx 40°$ | $\theta_{Tmax}(4) \approx 52°$ | $S_P(4) \approx 0.200$ | $L_P(4) \approx 0.544$ |

TABLE 4

Second Example Gear Pump Embodiment - Max Relief Parameters:

| Bearing | Max Relief | | | | |
|---|---|---|---|---|---|
| | Pump Speed (RPM) | Radial Load (psig/kPa) | Load Angle Range | Film thickness w/o pad (μin) | Film thickness with pad (μin) |
| Drive-Side | 8335 | $F(1) \approx 408/2812$ | $\theta_F(1) \approx 35.2°-48.2°$ | 9.1 | 20.6 |
| Drive-Side Stationary 34 | 8335 | $F(1) \approx 408/2812$ | $\theta_F(1) \approx 35.2°-48.2°$ | 9.1 | 20.6 |
| Drive-Side Floating 35 | 8335 | $F(2) \approx 408/2812$ | $\theta_F(2) \approx 35.2°-48.2°$ | 9.1 | 20.6 |
| Driven-Side Stationary 36 | 8335 | $F(3) \approx 550/3792$ | $\theta_F(3) \approx 50.5°-61.5°$ | 6.9 | 13.6 |
| Drive-Side Floating 37 | 8335 | $F(4) \approx 550/3792$ | $\theta_F(4) \approx 50.5°-61.5°$ | 6.9 | 13.6 |

Parameters for another alternative embodiment are shown in Tables 5 and 6.

TABLE 5

Third Example Gear Pump Embodiment - Hybrid Pad Parameters:

| Bearing | Hybrid Pad | | | | |
|---|---|---|---|---|---|
| | Nominal Centerline | Minimum Leading Edge | Maximum Trailing Edge | Distance from Gear Face (in) | Pad Axial Length (in) |
| Drive-Side Stationary 34 | $\theta_P(1) \approx 36°$ | $\theta_{Lmin}(1) \approx 30°$ | $\theta_{Tmax}(1) \approx 42°$ | $S_P(1) \approx 0.200$ | $L_P(1) \approx 0.501$ |
| Drive-Side Floating 35 | $\theta_P(2) \approx 36°$ | $\theta_{Lmin}(2) \approx 30°$ | $\theta_{Tmax}(2) \approx 42°$ | $S_P(2) \approx 0.200$ | $L_P(2) \approx 0.501$ |
| Driven-Side Stationary 36 | $\theta_P(3) \approx 42°$ | $\theta_{Lmin}(3) \approx 36°$ | $\theta_{Tmax}(3) \approx 48°$ | $S_P(3) \approx 0.200$ | $L_P(3) \approx 0.501$ |
| Drive-Side Floating 37 | $\theta_P(4) \approx 42°$ | $\theta_{Lmin}(4) \approx 36°$ | $\theta_{Tmax}(4) \approx 48°$ | $S_P(4) \approx 0.200$ | $L_P(4) \approx 0.501$ |

TABLE 6

Third Example Gear Pump Embodiment - Max Relief Parameters:

| Bearing | Max Relief | | | | |
|---|---|---|---|---|---|
| | Pump Speed (RPM) | Radial Load (psig/kPa) | Load Angle Range | Film thickness w/o pad (μin) | Film thickness with pad (μin) |
| Drive-Side Stationary 34 | 8335 | $F(1) \approx 506/3487$ | $\theta_F(1) \approx 42.7°-54.9°$ | 5.8 | 19.8 |
| Drive-Side Floating 35 | 8335 | $F(2) \approx 506/3487$ | $\theta_F(2) \approx 42.7°-54.9°$ | 5.8 | 19.8 |

TABLE 6-continued

Third Example Gear Pump Embodiment - Max Relief Parameters:

| | | Max Relief | | | |
|---|---|---|---|---|---|
| Bearing | Pump Speed (RPM) | Radial Load (psig/kPa) | Load Angle Range | Film thickness w/o pad (μin) | Film thickness with pad (μin) |
| Driven-Side Stationary 36 | 8335 | F(3) ≈ 590/4066 | $\theta_F(3)$ ≈ 49.4°-57.4° | 4.8 | 14.4 |
| Drive-Side Floating 37 | 8335 | F(4) ≈ 590/4066 | $\theta_F(4)$ ≈ 49.4°-57.4° | 4.8 | 14.4 |

In one example, the two alternative example pump embodiments (parameters listed in Tables 3 to 6) can work together as part of an aircraft fuel system, whereby one pump serves as a main fuel pump, while the other is configured to operate as a servo pump.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gear pump comprising:
a drive gear mounted to a first gear shaft between a first longitudinal end and a second longitudinal end;
a driven gear meshable with the drive gear, the driven gear mounted to a second gear shaft between a first longitudinal end and a second longitudinal end;
a plurality of journal bearings including at least:
a drive-side pressure loaded journal bearing configured to support the first longitudinal end of the first gear shaft on a fluid film formed annularly between a surface of the drive-side pressure loaded journal bearing and a surface of the first longitudinal end of the first gear shaft during rotation thereof;
a drive-side stationary journal bearing configured to support the second longitudinal end of the first gear shaft on a fluid film formed annularly between a surface of the drive-side stationary journal bearing and a surface of the second longitudinal end of the first gear shaft during rotation thereof;
a driven-side pressure loaded journal bearing configured to support the first longitudinal end of the second gear shaft on a fluid film formed annularly between a surface of the driven-side pressure loaded journal bearing and a surface of the first longitudinal end of the first gear shaft during rotation thereof; and
a driven-side stationary journal bearing configured to support the second longitudinal end of the second gear shaft on a fluid film formed annularly between a surface of the driven-side stationary journal bearing and a surface of the second longitudinal end of the second gear shaft during rotation thereof;
a first hybrid pad recess location on an inner surface of a first journal bearing selected from the plurality of journal bearings, the first hybrid pad recess location having a minimum leading edge angular location of at least 30.0° in a direction of gear rotation measured relative to a corresponding bearing flat, and a maximum trailing edge angular location of 47.0° in the direction of gear rotation measured relative to the corresponding bearing flat; and
a first porting path adapted to provide high pressure fluid communication from a discharge of the gear pump to the first hybrid pad recess location, the high pressure fluid supplementing the fluid film formed during rotation of the corresponding first or second longitudinal end of the first or second gear shaft;
wherein the first porting path comprises:
a discharge face cut on the first journal bearing for receiving the high pressure fluid from the discharge of the gear pump;
a radial spool cut on the first journal bearing;
an axial hole through the first journal bearing for communicating the high pressure fluid from the discharge face cut to the radial spool cut; and
a capillary port extending through the first journal bearing from the radial spool cut to the first hybrid pad recess location for delivering the high pressure fluid from the radial spool cut to the first hybrid pad recess location.

2. The gear pump of claim 1, wherein a centerline of the capillary port is axially spaced at least 0.300 inch (0.762 cm) from an adjacent face of the drive gear.

3. The gear pump of claim 1, wherein the capillary port has a diameter of at least 0.023 inch (0.058 cm).

4. The gear pump of claim 1, wherein, in use, the first porting path is adapted to maintain a first hybrid pad at the first hybrid pad recess location and feed a first fluid film at the first fluid film location, the first fluid film adapted to support a radial load of at least approximately 594 lb$_f$/in$^2$ (4095 kPa) at or near the first hybrid pad.

5. The gear pump of claim 1, wherein the first journal bearing is the drive-side stationary journal bearing or the drive-side pressure loaded bearing, and the first hybrid pad recess location has a minimum leading edge angular location of 30.0° in a direction of drive gear rotation relative to the bearing flat, and a maximum trailing edge angular location of 42.0° in the direction of drive gear rotation relative to the bearing flat.

6. The gear pump of claim 1, wherein the first journal bearing is the driven-side stationary journal bearing or the drive-side pressure loaded bearing, and the hybrid pad recess location has a minimum leading edge angular location of 35.0° in a direction of drive gear rotation relative to the bearing flat, and a maximum trailing edge angular location of 47.0° in the direction of drive gear rotation relative to the bearing flat.

7. The gear pump of claim 1, further comprising:
a second porting path adapted to provide fluid communication from the discharge of the gear pump to a second hybrid pad recess location for a second journal bearing selected from the plurality of journal bearings, the high pressure fluid supplementing the fluid film formed during rotation of the corresponding first or second longitudinal end of the first or second gear shaft.

8. The gear pump of claim 7, wherein the first journal bearing and the second journal bearing are both on the first gear shaft or both on the second gear shaft.

9. The gear pump of claim 7, wherein the first journal bearing is on one of the first and second gear shafts, and the second journal bearing is on the other of the first and second gear shafts.

10. The gear pump of claim 7, further comprising:
a third porting path adapted to provide fluid communication from the discharge of the gear pump to a third hybrid pad recess location for a third journal bearing selected from the plurality of journal bearings, the high pressure fluid supplementing the fluid film formed during rotation of the corresponding first or second longitudinal end of the first or second gear shaft; and
a fourth porting path adapted to provide fluid communication from the discharge of the gear pump to a fourth hybrid pad recess location for a fourth journal bearing selected from the plurality of journal bearings, the high pressure fluid supplementing the fluid film formed during rotation of the corresponding first or second longitudinal end of the first or second gear shaft.

11. The gear pump of claim 1, wherein the fluid film is Jet A-1 fluid, and wherein the fluid film is approximately 300° F. (149° C.) when entering the gear pump.

12. A shaft support assembly for a gear pump, the assembly comprising:
a first journal bearing configured to support a first longitudinal end of a first gear shaft during rotation thereof, the first journal bearing comprising:
a cylindrical body including a generally circumferential outer surface;
a bearing flat forming a portion of the otherwise circumferential outer surface;
a central recess formed in a longitudinal end of the cylindrical body of the first journal bearing, the central recess adapted to receive and support a first longitudinal end of the first gear shaft on a first fluid film formed annularly between an inner surface of the first journal bearing central recess, and an outer surface of the first longitudinal end of the first gear shaft during rotation thereof;
a first hybrid pad recess location on the inner surface of the central recess, the first hybrid pad recess location having a minimum leading edge angular location of at least 30.0° relative to the bearing flat in a direction of rotation of the first gear shaft, and a maximum trailing edge angular location of 47.0° relative to the bearing flat in the direction of rotation of the first gear shaft; and
a first porting path adapted to provide high pressure fluid communication between an exterior of the first journal bearing and the first hybrid pad recess location, the first porting path extending through the cylindrical body of the first journal bearing;
wherein the first porting path comprises:
a discharge face cut on the outer circumferential surface of the body, for receiving the high pressure fluid from a gear pump discharge;
a radial spool cut on the outer circumferential surface of the body;
an axial hole through the cylindrical body of the first journal bearing for communicating the high pressure fluid from the discharge face cut to the radial spool cut; and
a capillary port extending through the cylindrical body from the radial spool cut to the first hybrid pad recess location for delivering the high pressure fluid from the radial spool cut to the first hybrid pad recess location.

13. The shaft support assembly of claim 12, wherein the first gear shaft is a drive-side gear shaft comprising a drive gear mounted to the drive-side gear shaft, the drive gear including a first axial face and a second axial face.

14. The shaft support assembly of claim 13, wherein a maximum diametral clearance between an inner surface of the first journal bearing central recess and the outer surface of the first longitudinal end of the first gear shaft is approximately 0.0039 inch (0.00991 cm) during rotation thereof.

15. The shaft support assembly of claim 13, wherein the first hybrid pad recess location is axially spaced approximately 0.300 inch (0.76 cm) from the first axial face of the drive gear.

16. The shaft support assembly of claim 13, wherein, in use, the first porting path is adapted to maintain a first hybrid pad at the first hybrid pad recess location, the first hybrid pad having an axial length of approximately 0.540 inch (1.37 cm).

17. The shaft support assembly of claim 16, wherein the first hybrid pad supplements the first fluid film which supports a radial load of up to approximately 594 lb/in² (4095 kPa) at or near the first hybrid pad recess location.

18. The shaft support assembly of claim 17, wherein the supplemented first fluid film supports the radial load at or near the first hybrid pad recess location while the first gear shaft is rotated at a speed of up to approximately 8935 RPM.

19. The shaft support assembly of claim 17, wherein the radial load is at an angular location of approximately 49.2° relative to the bearing flat in the direction of rotation of the first gear shaft.

20. The shaft support assembly of claim 17, wherein supplementing the first fluid film with the high pressure lubricant increases a thickness of the first fluid film by approximately 0.000012 inch (0.000030 cm) at or near the first hybrid pad recess location.

21. The shaft support assembly of claim 13, wherein the first hybrid pad recess location has a maximum trailing edge angular location of 42.0° relative to the bearing flat in the direction of rotation of the first gear shaft.

22. The shaft support assembly of claim 13, further comprising:
a second journal bearing configured to support a second longitudinal end of the first gear shaft during rotation thereof, the second journal bearing comprising:

a cylindrical body including a generally circumferential outer surface;

a bearing flat forming a portion of the otherwise circumferential outer surface;

a central recess formed in a longitudinal end of the cylindrical body, the central recess adapted to receive and support the second longitudinal end of the first gear shaft on a second fluid film formed annularly between an inner surface of the second journal bearing central recess, and an outer surface of the first gear shaft second longitudinal end during rotation thereof;

a second hybrid pad recess location circumferentially adjacent to a fluid film location, the second hybrid pad recess location having a minimum leading edge angular location of at least 30.0° relative to the bearing flat in a direction of rotation of the first gear shaft, and a maximum trailing edge angular location of 47.0° relative to the bearing flat in the direction of rotation of the first gear shaft; and a second porting path adapted to provide high pressure fluid communication between an exterior of the second journal bearing and the second hybrid pad recess location, the second porting path extending through the cylindrical body of the second journal bearing;

wherein the second porting path comprises:
- a discharge face cut on the outer circumferential surface of the second journal bearing body for receiving the high pressure fluid;
- a radial spool cut on the outer circumferential surface of the second journal bearing body;
- an axial hole through the cylindrical body for communicating the high pressure fluid from the discharge face cut to the radial spool cut; and
- a capillary port extending through the cylindrical body from the radial spool cut to the second hybrid pad recess location for delivering the high pressure fluid from the radial spool cut to the second hybrid pad recess location.

23. The shaft support assembly of claim 22, wherein the second hybrid pad recess location is axially spaced approximately 0.300 inch (0.76 cm) from the second axial face of the drive gear.

24. The shaft support assembly of claim 22, wherein the first journal bearing is a stationary bearing, and the second journal bearing is a pressure-loaded journal bearing, or vice versa.

25. The shaft support assembly of claim 13, further comprising:
a driven gear meshable with the drive gear, the driven gear mounted to a second gear shaft.

26. The shaft support assembly of claim 12, wherein the first gear shaft is a driven-side gear shaft comprising a driven gear mounted to the driven-side gear shaft, the driven gear including a first axial face and a second axial face.

27. The shaft support assembly of claim 26, wherein the first hybrid pad recess location has a minimum leading edge angular location of about 35.0° in a direction of rotation of the driven-side gear shaft and a maximum trailing edge angular location of about 47.0° measured relative to the bearing flat in the direction of rotation of the driven-side gear shaft.

28. The shaft support assembly of claim 26, wherein, in use, the first porting path is adapted to maintain a first hybrid pad at the first hybrid pad recess location, the first hybrid pad having an axial length of approximately 0.540 inch (1.37 cm).

29. The shaft support assembly of claim 26, wherein the first hybrid pad supplements the first fluid film which supports a radial load of up to approximately 690 lb/in² (4757 kPa) at or near the first hybrid pad, and the radial load is at an angular location of approximately 55.9° measured relative to the bearing flat in the direction of rotation of the first gear shaft.

30. The shaft support assembly of claim 29, wherein the supplemented first fluid film supports the radial load at or near the first hybrid pad while the first gear shaft is rotated at a speed of up to approximately 8935 RPM.

31. The shaft support assembly of claim 29, wherein the supplemented first fluid film increases a thickness of the first fluid film by approximately 0.000012 inch (0.000030 cm) at or near the first hybrid pad.

32. The shaft support assembly of claim 26, further comprising:
a drive gear meshable with the driven gear, the drive gear mounted to a second gear shaft.

* * * * *